US006798649B1

(12) United States Patent
Olodort et al.

(10) Patent No.: US 6,798,649 B1
(45) Date of Patent: Sep. 28, 2004

(54) MOBILE COMPUTER WITH FOLDABLE KEYBOARD

(75) Inventors: Robert Olodort, Santa Monica, CA (US); Peter M. Cazalet, Campbell, CA (US); Russell Mead, Mountain View, CA (US); John Tang, San Carlos, CA (US)

(73) Assignee: Think Outside, Inc., Santa Clara, CA (US)

( * ) Notice: Subject to any disclaimer, the term of this patent is extended or adjusted under 35 U.S.C. 154(b) by 0 days.

(21) Appl. No.: 10/254,721

(22) Filed: Sep. 24, 2002

Related U.S. Application Data

(60) Provisional application No. 60/359,596, filed on Feb. 25, 2002.

(51) Int. Cl.[7] ................................................. G06F 1/16
(52) U.S. Cl. .................... 361/683; 361/680; 455/575.1; 400/82; 400/693; 312/223.1; 345/905; 235/61 R
(58) Field of Search ................................ 361/680–686; 455/566, 575.1, 575.2, 557, 90, 546, 575; 400/82, 489, 691–693, 488; 345/168, 905, 169; 312/223.1–223.6; 235/61 R, 462.01, 375

(56) References Cited

U.S. PATENT DOCUMENTS

| | | |
|---|---|---|
| 3,940,758 A | 2/1976 | Margolin |
| 4,497,036 A | 1/1985 | Dunn |
| 4,939,514 A | 7/1990 | Miyazaki |
| 5,187,644 A | 2/1993 | Crisan |
| 5,189,404 A | 2/1993 | Masimo et al. |
| 5,267,127 A | 11/1993 | Pollitt |
| 5,360,196 A | 11/1994 | DiGiulio et al. |
| 5,383,138 A | 1/1995 | Motoyama et al. |
| 5,390,075 A * | 2/1995 | English et al. ............... 361/683 |
| 5,434,964 A | 7/1995 | Moss et al. |
| 5,457,453 A | 10/1995 | Chiu |
| 5,502,460 A | 3/1996 | Bowen |
| 5,519,569 A | 5/1996 | Sellers |
| 5,566,098 A | 10/1996 | Lucente et al. |
| 5,574,481 A | 11/1996 | Lee |

(List continued on next page.)

FOREIGN PATENT DOCUMENTS

| | | |
|---|---|---|
| DE | 19648802.8 A1 | 5/1998 |
| EP | 0640489 A2 | 3/1995 |
| EP | 0691603 A1 | 1/1996 |
| EP | 0933908 A2 | 8/1999 |
| EP | 1161062 A2 | 12/2001 |

(List continued on next page.)

OTHER PUBLICATIONS

Sharp Introduces the SL–C700 Zaurus Personal Mobile Tool, World's First PDA with 307,200–Pixel, VGA System LCD, SHARP press Release at http://sharp–world.com/corporate/news/021112.html, pp. 1–9, Sep. 11, 2003.
PCT International Search Report for PCT Appln. No. US03/04959, mailed Sep. 5, 2003 (9 pages).

Primary Examiner—Lisa Lea-Edmonds
(74) Attorney, Agent, or Firm—Blakely, Sokoloff, Taylor & Zafman LLP

(57) ABSTRACT

A digital processing device including a base, a display assembly, a hinge assembly, and a foldable keyboard is described. The hinge assembly enables the back of the display assembly to be rotated between a first configuration and a second configuration. In the first configuration, the user may interact with the device in a similar manner as a PDA. In the second configuration, the hinge assembly enables the unfolding of the keyboard assembly so that it is accessible to the user to enter information by typing and the display assembly is positioned for viewing of information. The keyboard assembly unfolds to form a full-size keyboard (e.g., conformance with an ISO 9241–4:1998(E) standard) that allows a user to comfortably, quickly, and accurately "touch-type" in a manner that the user may be accustomed to. The base may be rigid to enable use of the keyboard assembly on soft or uneven surfaces.

44 Claims, 28 Drawing Sheets

U.S. PATENT DOCUMENTS

| | | |
|---|---|---|
| 5,638,257 A | 6/1997 | Kumar et al. |
| 5,644,338 A | 7/1997 | Bowen |
| 5,648,771 A | 7/1997 | Halgren et al. |
| 5,653,543 A | 8/1997 | Abe |
| 5,661,632 A | 8/1997 | Register |
| 5,666,694 A | 9/1997 | Slow et al. |
| 5,677,826 A | 10/1997 | Sellers |
| 5,687,058 A | 11/1997 | Roylance |
| 5,703,578 A | 12/1997 | Allison |
| 5,706,167 A | 1/1998 | Lee |
| 5,712,760 A | 1/1998 | Coulon et al. |
| 5,715,524 A | 2/1998 | Jambhekar et al. |
| 5,733,056 A | 3/1998 | Meagher |
| 5,742,475 A | 4/1998 | Riddiford |
| 5,800,085 A | 9/1998 | Lee |
| 5,841,635 A | 11/1998 | Sadler |
| 5,926,364 A | 7/1999 | Karidis |
| 5,933,320 A | 8/1999 | Malhi |
| 5,941,648 A | 8/1999 | Robinson et al. |
| 5,943,041 A | 8/1999 | Allison et al. |
| 5,949,408 A | 9/1999 | Kang et al. |
| 5,953,205 A | 9/1999 | Kambayashi et al. |
| 5,973,664 A | 10/1999 | Badger |
| 5,979,757 A | 11/1999 | Tracy et al. |
| 5,995,025 A | 11/1999 | Sternglass et al. |
| 6,137,468 A | 10/2000 | Martinez |
| 6,151,012 A | 11/2000 | Bullister |
| 6,206,281 B1 * | 3/2001 | Leung ..................... 235/61 R |
| 6,256,017 B1 | 7/2001 | Bulliser |
| 6,262,882 B1 * | 7/2001 | Suzuki ....................... 361/680 |
| D448,032 S * | 9/2001 | Talley ........................ D14/396 |
| 6,384,811 B1 * | 5/2002 | Kung et al. ................. 345/168 |
| 6,587,675 B1 * | 7/2003 | Riddiford ................... 455/557 |
| 6,628,508 B2 * | 9/2003 | Lieu et al. .................. 361/680 |
| 2002/0001489 A1 | 1/2002 | Li |
| 2002/0003530 A1 | 1/2002 | Hsu et al. |
| 2002/0020789 A1 | 2/2002 | Li |
| 2002/0021935 A1 | 2/2002 | Li |
| 2002/0030965 A1 | 3/2002 | Katz |
| 2002/0063690 A1 * | 5/2002 | Chung et al. ............... 345/168 |

FOREIGN PATENT DOCUMENTS

| | | |
|---|---|---|
| GB | 2279617 | 1/1995 |
| GB | 2318195 A | 4/1998 |
| GB | 2323331 | 9/1998 |
| JP | H3-17723 | 6/1989 |
| JP | 04365115 | 12/1992 |
| JP | 08190834 | 7/1996 |
| JP | 10293624 | 11/1998 |
| JP | 2000-356180 | 3/2002 |
| WO | WO 91/19245 | 12/1991 |
| WO | WO 97/04380 | 2/1997 |
| WO | WO 99/18491 | 4/1999 |
| WO | WO 99/26125 | 5/1999 |
| WO | WO 00/60438 A2 | 10/2000 |

* cited by examiner

MOBILE COMPUTER WITH FOLDABLE KEYBOARD

REFERENCE TO RELATED APPLICATION

This application is related to and claims the benefit of U.S. provisional application No. 60/359,596 entitled "Mobile Computer with Foldable Keyboard," filed Feb. 25, 2002.

FIELD OF THE INVENTION

This invention relates to the field of digital processing devices and, in particular, to a compact digital processing devices having a foldable keyboard.

BACKGROUND

Personal Digital Assistants (PDAs) have succeeded as useful devices as electronic replacements of calendars and address books. Unlike notebook computers, PDAs are small enough to hold in the palm of one hand (grasped entirely within the fingers of one hand) or fit in a pocket. They power on instantly, and are easy to use. They have touch screens and styluses, which when used with appropriate handwriting recognition or onscreen "virtual" keyboards, allow for navigation, retrieving information, or entering small amounts of text. Recent advances in processing power, memory capacity, and application software, combined with the proliferation of wireless networks, have allowed PDAs to become very useful as communication devices and replacements for notebook computers. But in order to perform adequately as an e-mail machine or a notetaking device, a PDA must allow the user to quickly and comfortably enter text. Notebook computers have full size keyboards, which have been found to be the only successful solution for fast and convenient text entry. What is needed is a device that has the convenience of a PDA but has the text entry capabilities of the best notebook computers. What is also needed is a device that converts from a PDA to a notebook computer form factor.

The keyboard standard described by ISO 9241–4:1998(E) 6.2.1 calls for center-to-center key spacing of 19 mm+/–1 mm. ISO 9241–4:1998(E) 6.2.3 calls for preferred key displacement between 2.0 mm and 4.0 mm. Experience has shown that keyboards should be designed in conformance with these standards in order to allow touch-typing.

U.S. Pat. No. 5,949,408, assigned to Hewlett-Packard Company, describes a product marketed by Hewlett-Packard known as the "OmniGo 100" and is shown in FIG. 1A. It is a PDA with a built-in keyboard. However, in order to fit the keyboard in a housing small enough for a PDA size, the keyboard is a small "chicklet" type that does not allow touch-typing. The center-to-center spacing of the keys is less than 13 mm horizontally and less than 10 mm vertically. The key "travel" or displacement is less than 0.5 mm. This is clearly outside the ISO specification quoted above.

GB 2,279,617 describes a PDA, shown in FIG. 1C, with a built-in keyboard. However, the keyboard is a "flexible film" or membrane type keyboard. Keyboards like this have key displacements of a fraction of a millimeter and lack tactile feedback. For this reason they prevent touch-typing. Additionally, a keyboard of this design would require placement on a rigid flat surface and could not be use on one's lap without the addition of such a surface.

EP 691,603 describes a notebook computer with a built-in folding keyboard. However, this device does not convert to a hand held PDA.

U.S. Pat. No. 5,666,694 describes a double hinge arrangement for a "clam-shell" like device shown in FIG. 1B. It uses a friction clutch and spring mechanism to sequence the rotation of the two panels. However, this mechanism is complicated, consumes much space, and the relative positions of the two panels are not necessarily kept constant.

Some prior art PDAs employ screen rotation techniques to rotate the configuration of the screen from portrait to landscape mode when the PDA is switched from a PDA data entry mode to a keyboard data entry mode. Various methods have been used to perform such screen rotation. For examples, using software pixel manipulation (e.g., as used in the HandEra, and Jimmy Software for the Compaq iPAQ) and by hardware assisted pixel manipulation (e.g., as performed by the MediaQ chip in Sony's Clie).

Another screen rotation method used in Hewlett Packard's OmniGo employs a customized LCD panel where the rotation is performed in the LCD panel, itself, in order to provide minimum impact on the software. One disadvantage of the screen rotation techniques employed in the Hewlett Packard OmniGo is that the LCD panel must be symmetrical (e.g., 240 v 240), thereby limiting the size of the display screen that may be used in PDAs. Another disadvantage of the screen rotation techniques employed in the Hewlett Packard OmniGo is that such techniques may only be used with monochrome displays that contain only a single cell for each pixel. For a color screen, each of the pixels, for example, may contain three colors—red, green, and blue—(RGB) cells lined in one direction, which require realignment to prevent color split. Such realignment may not be possible with the screen rotation techniques employed in the Hewlett Packard OmniGo. Another disadvantage of the Hewlett Packard OmniGo is that the device may not be practical for rotation beyond 90 degrees (e.g., 270 degrees of rotation), thereby limiting its range of use.

SUMMARY OF THE INVENTION

The present invention pertains to a digital processing device having a foldable keyboard. In one embodiment, the digital process device includes a rigid base, a display assembly with a display screen, a foldable keyboard assembly coupled with the base, and a hinge assembly that couples the display assembly to the base. The hinge assembly allows the display assembly to rotate between a first configuration and a second configuration.

Additional features and advantages of the present invention will be apparent from the accompanying drawings, and from the detailed description that follows below.

BRIEF DESCRIPTION OF THE DRAWINGS

The present invention is illustrated by way of example and not intended to be limited by the figures of the accompanying drawings.

DETAILED DESCRIPTION

Figure 1A:
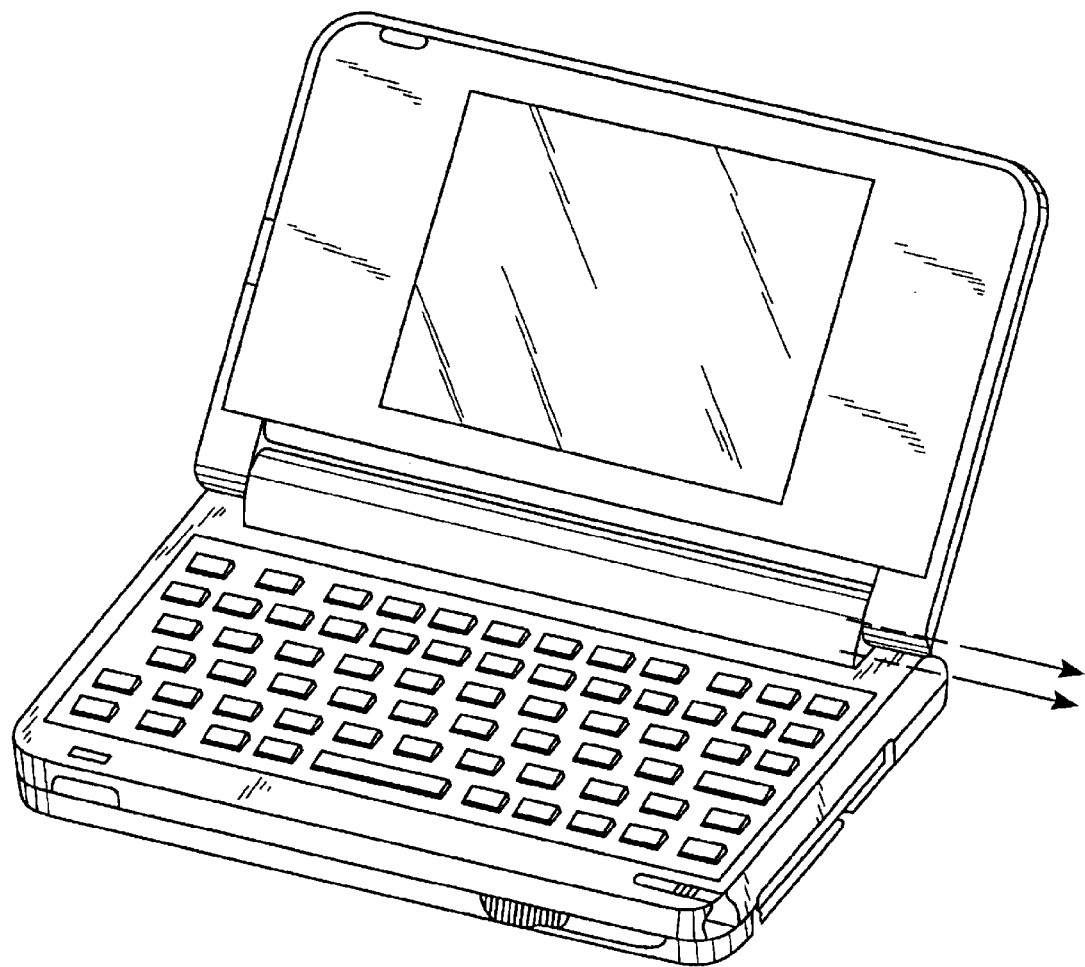
FIG. 1A illustrates a prior art PDA.
Figure 1B:
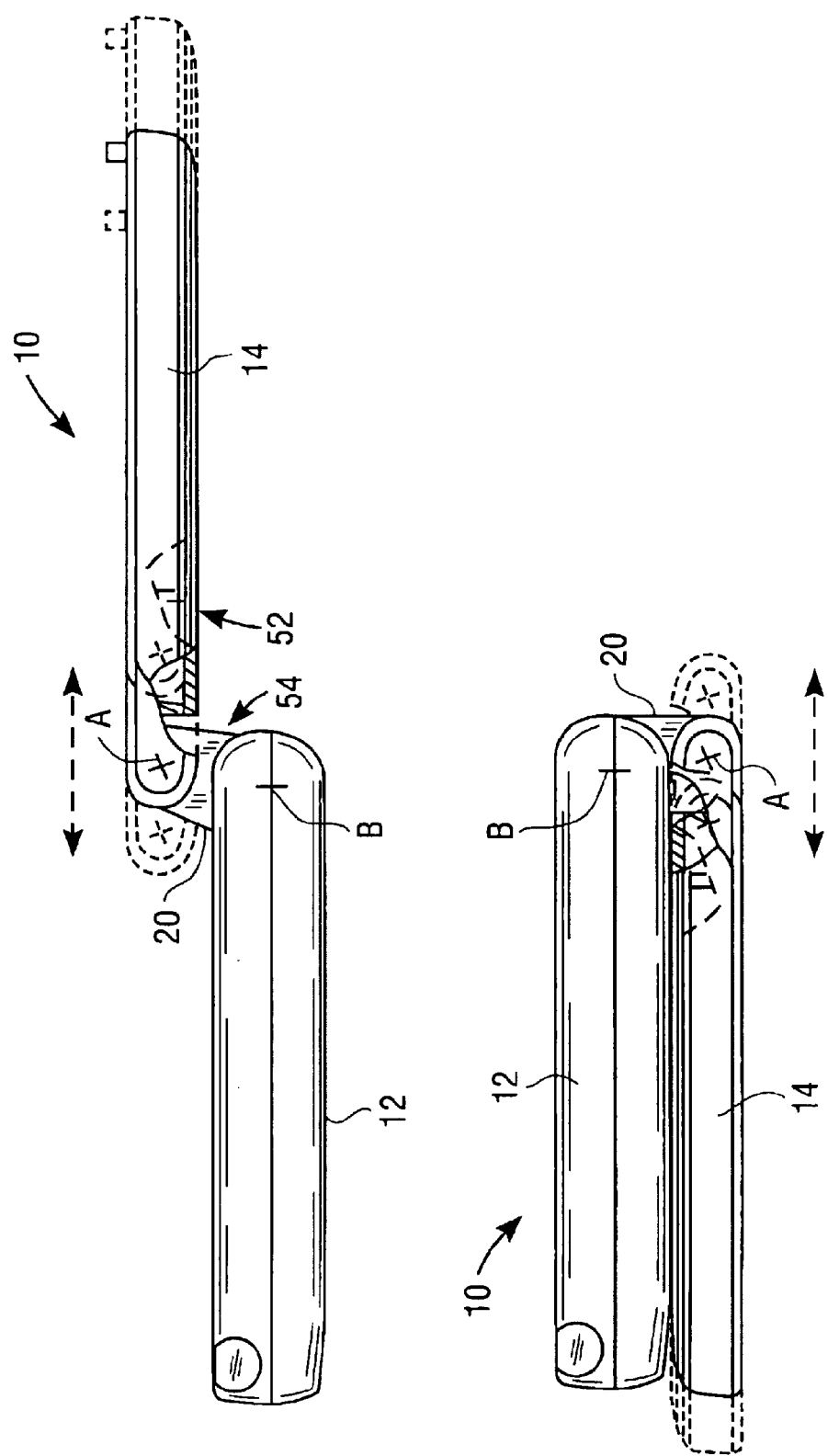
FIG. 1B illustrates a prior art hinge assembly on a PDA.
Figure 1C:
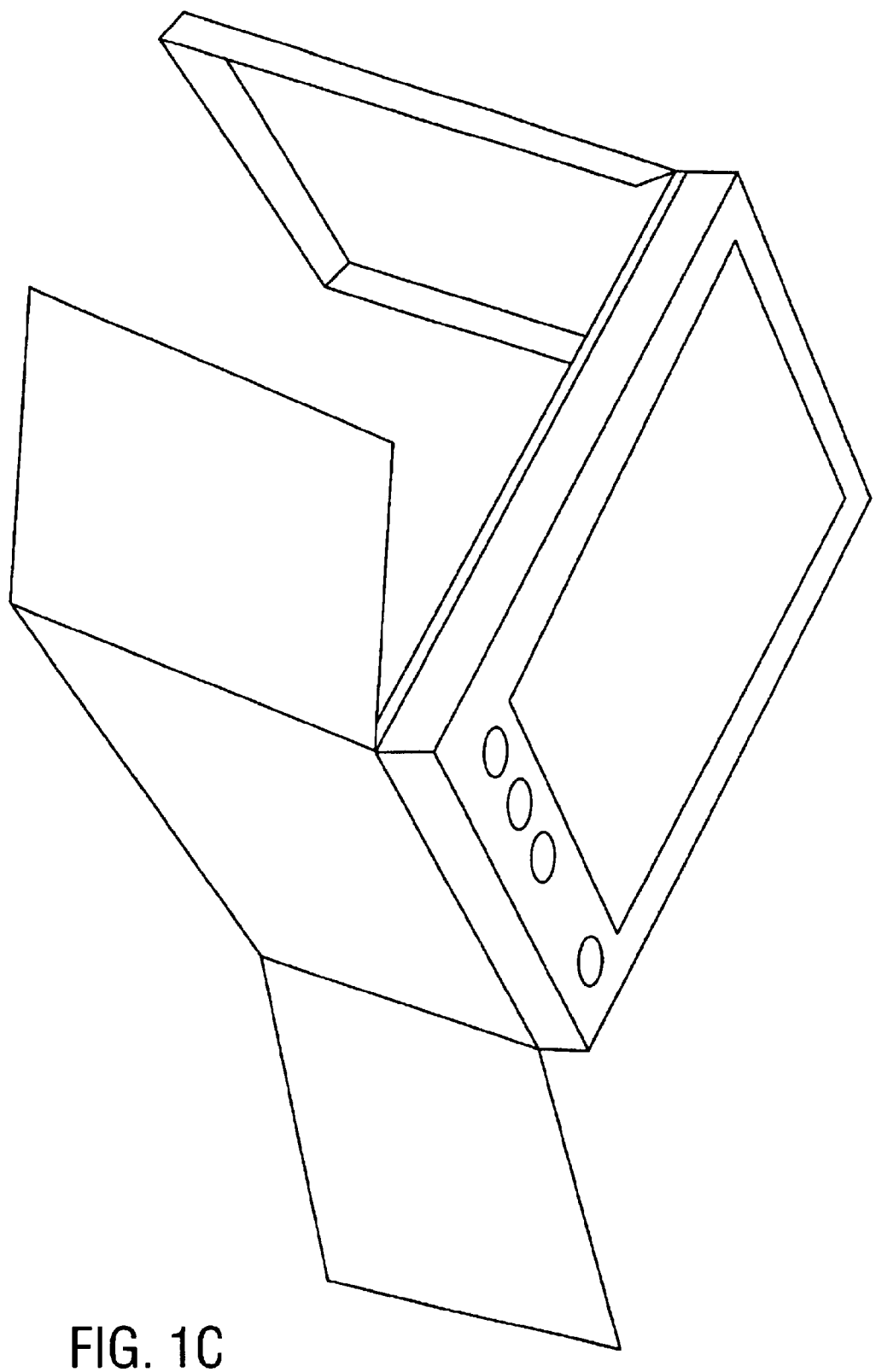
FIG. 1C illustrates a prior art device with a foldable keyboard.

In the following description, numerous specific details are set forth such as examples of specific, components, circuits, processes, etc. in order to provide a thorough understanding of the present invention. It will be apparent, however, to one skilled in the art that these specific details need not be employed to practice the present invention. In other instances, well known components or methods have not been described in detail in order to avoid unnecessarily obscuring the present invention. The term "coupled" as used herein means connected directly to or indirectly connected through one or more intervening components or circuits.

A digital processing device having a foldable keyboard is described. In one embodiment, the digital processing device includes a rigid base, a display assembly, and a foldable keyboard assembly coupled to the rigid base. The digital processing device also includes a hinge assembly to rotatably couple the display assembly to the base. The hinge assembly enables the back of the display assembly to be rotated between a first configuration and a second configuration. In the first configuration, the digital processing device is small enough to be held in the palm of the hand. The user may interact with the device in a similar manner as a personal digital assistant (PDA), handheld organizer, or other type of hand-held computing device with the keyboard assembly capable of folding to facilitate the holding of the device and to prevent unintentional interaction through the keyboard. In the second configuration, the digital processing device may be used in a similar manner as a portable computing device such as a laptop or notebook computer. In other words, the keyboard assembly is unfolded and is accessible to the user to enter information by typing and the display assembly is positioned for viewing of information (e.g., information that is entered by a user, information retrieved from a remote system on a network, etc.). The keyboard assembly unfolds to form a full-size keyboard (e.g., in conformance with ISO 9241-4:1998(E) 6.2.1/6.2.3 standards for keyboards) that allows a user to comfortably, quickly, and accurately "touch-type" in a manner that the user may be accustomed to. For example, the keyboard standard described by ISO 9241-4:1998(E) 6.2.1 calls for center-to-center key spacing of 19 mm+/-1 mm and the keyboard standard described by ISO 9241-4:1998(E) 6.2.3 calls for preferred key displacement between 2.0 mm and 4.0 mm. A copy of ISO 9241-4:1998(E) is attached as Appendix A hereto.

The device can quickly and easily transform to various useful positions. In its closed position, it has a protective housing so requires no case, and is small enough to be carried in a pocket or purse. In its PDA position, it operates just like a normal PDA. In one embodiment, the device has a touch screen and stylus and can be held in one hand with the thumb and fingers grasping either side of a portrait mode display. In its notebook position, its mechanical configuration is like a notebook computer—the unit can be placed on a surface or one's lap, with the display is in landscape mode and a full size keyboard beneath and in front of the display. In a desktop/docking like position, it can rest on a desktop without the need of an accessory stand, while providing a landscape mode display.

In order to facilitate the transformation of the various positions, in one embodiment, an X-shaped linkage can be used between the main body of the device and its display panel. This linkage may provide up to 360 degrees rotation of the display panel through a prescribed path, thus ensuring that the center of gravity of the device is controlled, so that the display and keyboard portions are always stable with respect to each other. The X-shaped linkage also consumes minimal space, provides constant friction in all positions, and allows routing of circuitry or an antenna though the hinge.

Figure 2A:
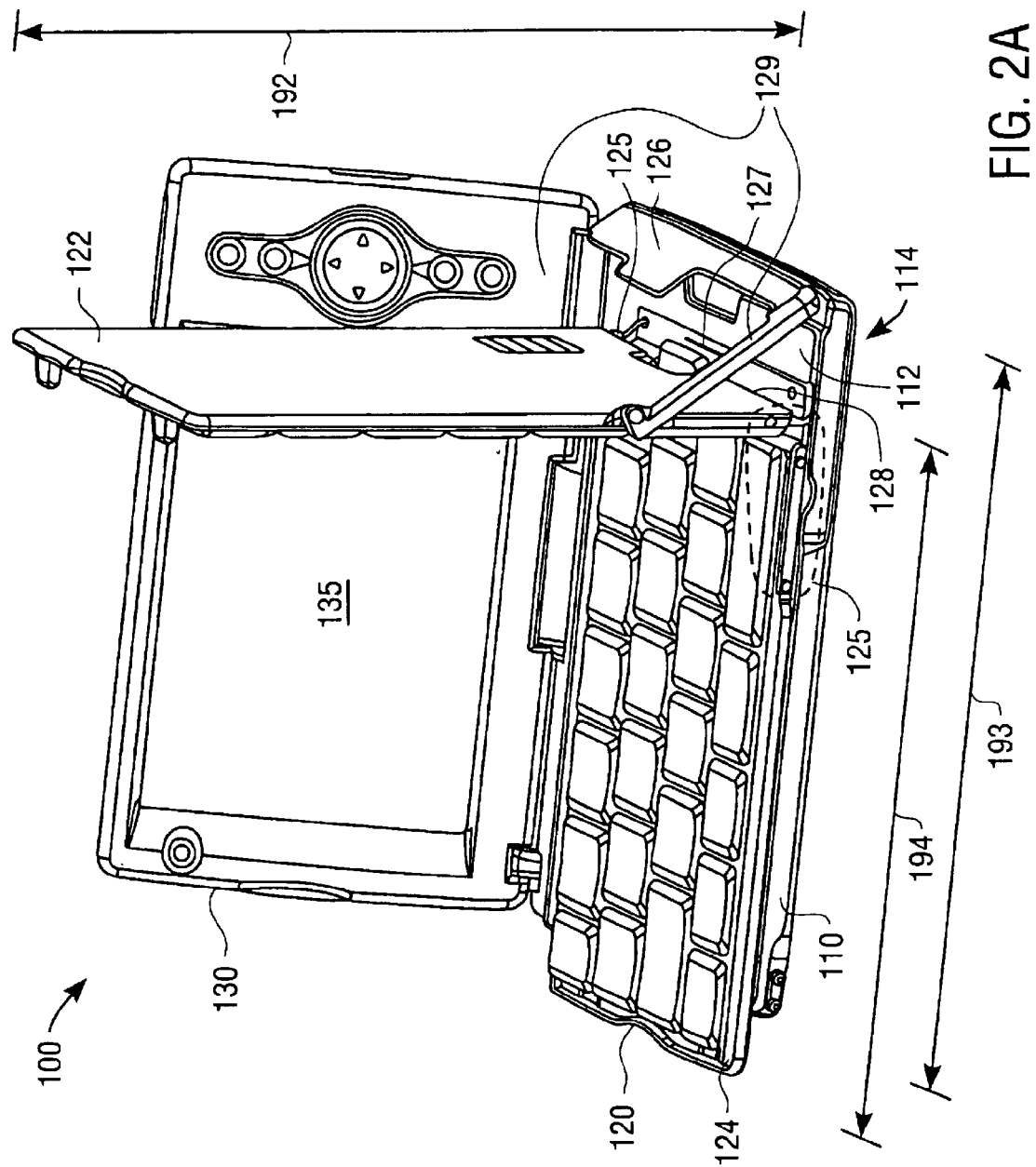
FIG. 2A illustrates one embodiment of a digital processing device having a foldable keyboard.

FIG. 2A illustrates one embodiment of a digital processing device having a foldable keyboard. In one embodiment, digital processing device 100 includes a rigid base 110, a foldable keyboard assembly 120, and a display assembly 130. The base 110 has a front 112 and a back 114. The front 112 of the base 110 is coupled to the keyboard assembly 120. A hinge assembly 140 rotatably couples the display assembly 130 to the base 110 and allows for the device 100 to be used in various configurations.

Figure 2B:
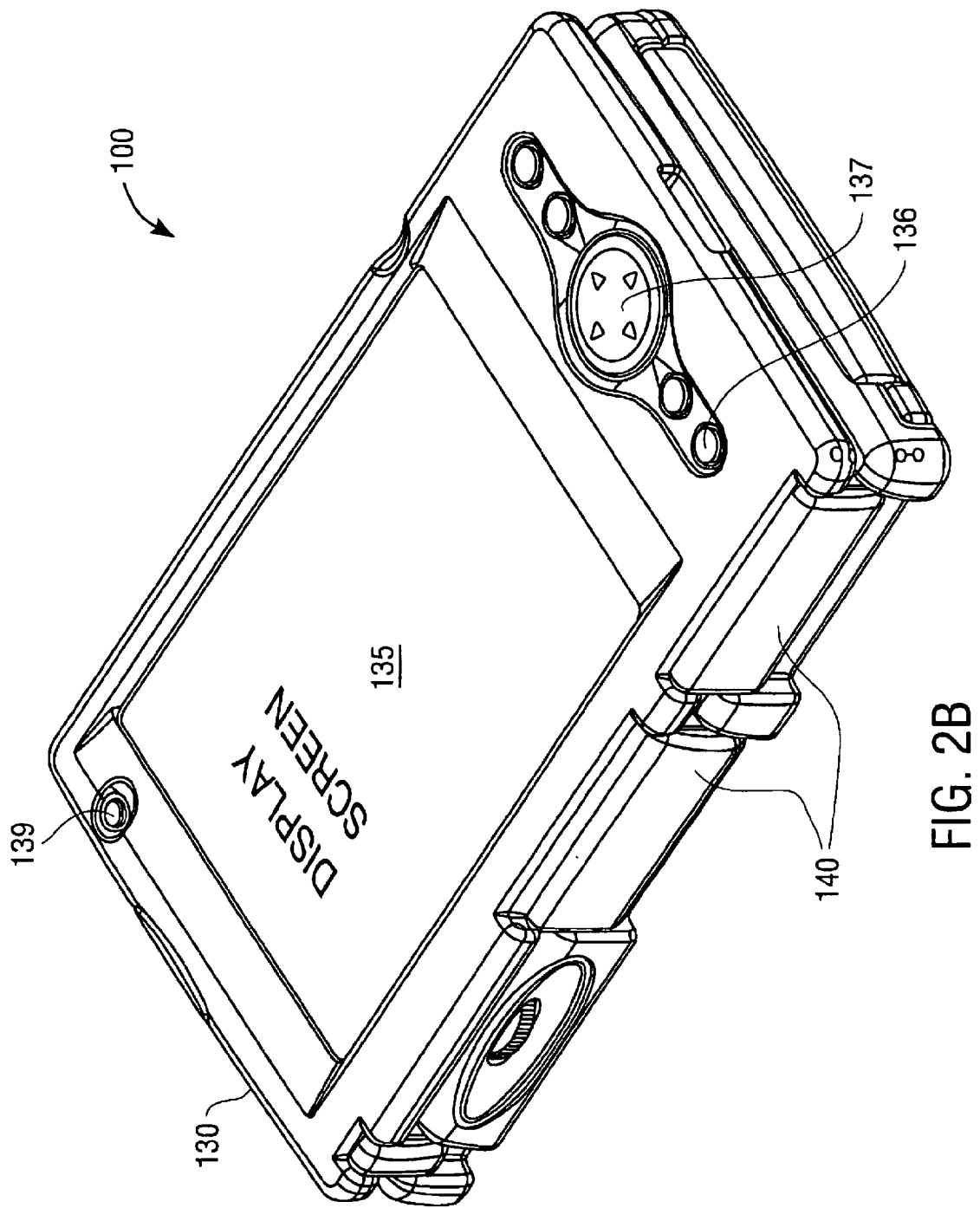
FIG. 2B illustrates one embodiment of the digital processing device in a first configuration.
Figure 2C:
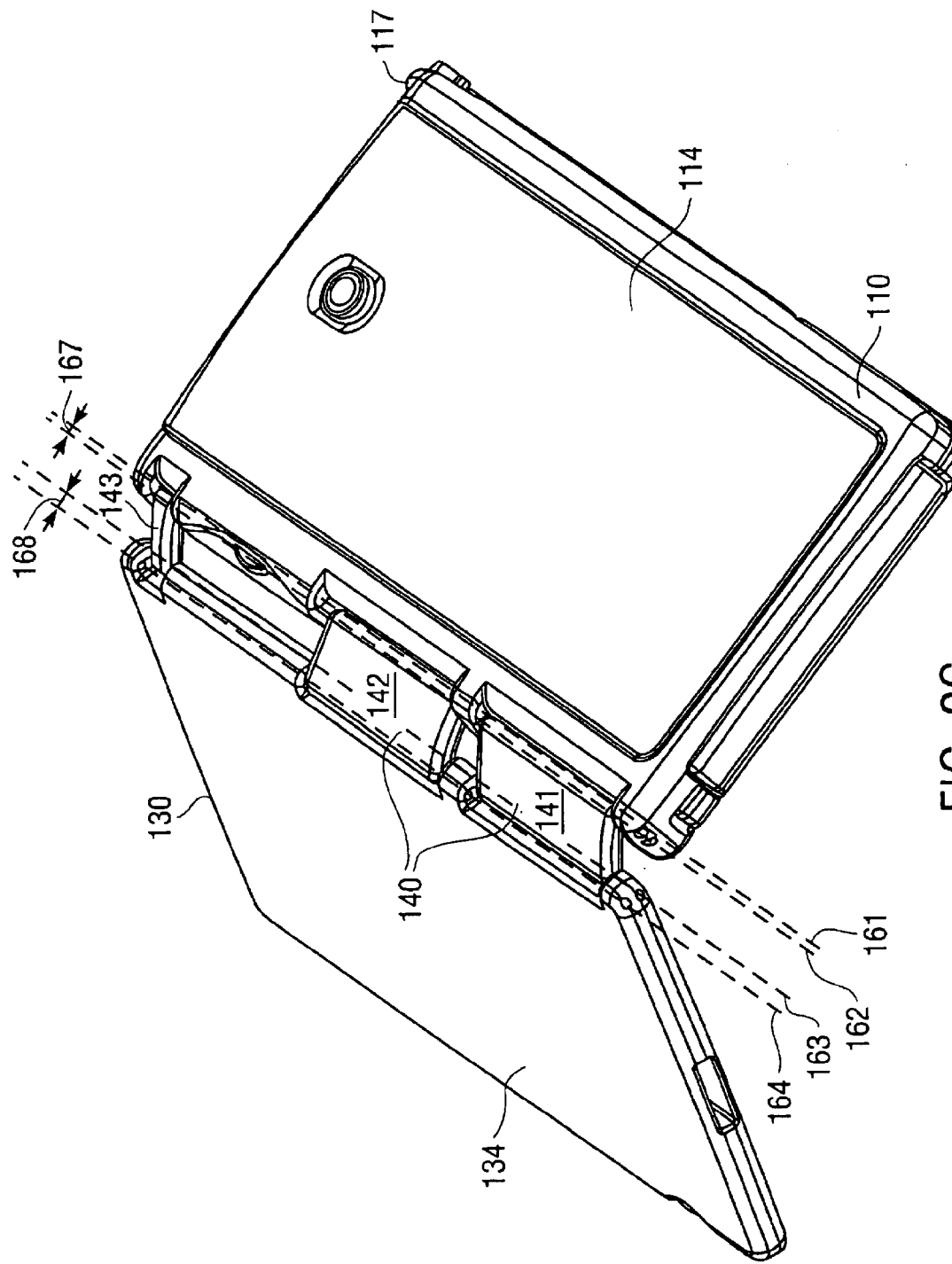
FIG. 2C illustrates one embodiment of a hinge assembly of the digital processing device.

FIG. 2B illustrates the device in a first configuration where the back 134 (as shown in FIG. 2C) of the display assembly 130 is rotated to be in contact 114 with the back 114 of the base 110. In the first configuration, the digital processing device 100 is small enough to be held in the palm of a user's hand. The user may interact with the device 100 in a similar manner to a personal digital assistant (PDA), handheld organizer, or other type of hand-held computing device, where information is displayed to the user in a portrait mode that has text and/or graphics that are oriented perpendicular to the longest side of display assembly 130.

The display assembly 130 includes a display screen 135 and one or more manual interface controls (e.g., button 136, push pad 137, dials, switches, etc.). The user may interact with digital processing device 100, for example, by touching (e.g., with finger, stylus 117, etc.) a touch sensitive display screen 135 or buttons on the display assembly 130, thereby entering data and/or commands into the device 100. In one embodiment, digital processing device 100 may also hardware and/or software to enable user interaction through other means, for example, voice recognition. Digital processing device 100 includes hardware and software to enable such operation as discussed below. In one embodiment, display screen 135 is a liquid crystal display. Alternatively, other types of display screens may be used, for example, electroluminescent displays. Display screens and manual interface controls are known in the art; accordingly, a detailed discussion is not provided.

Figure 2D:
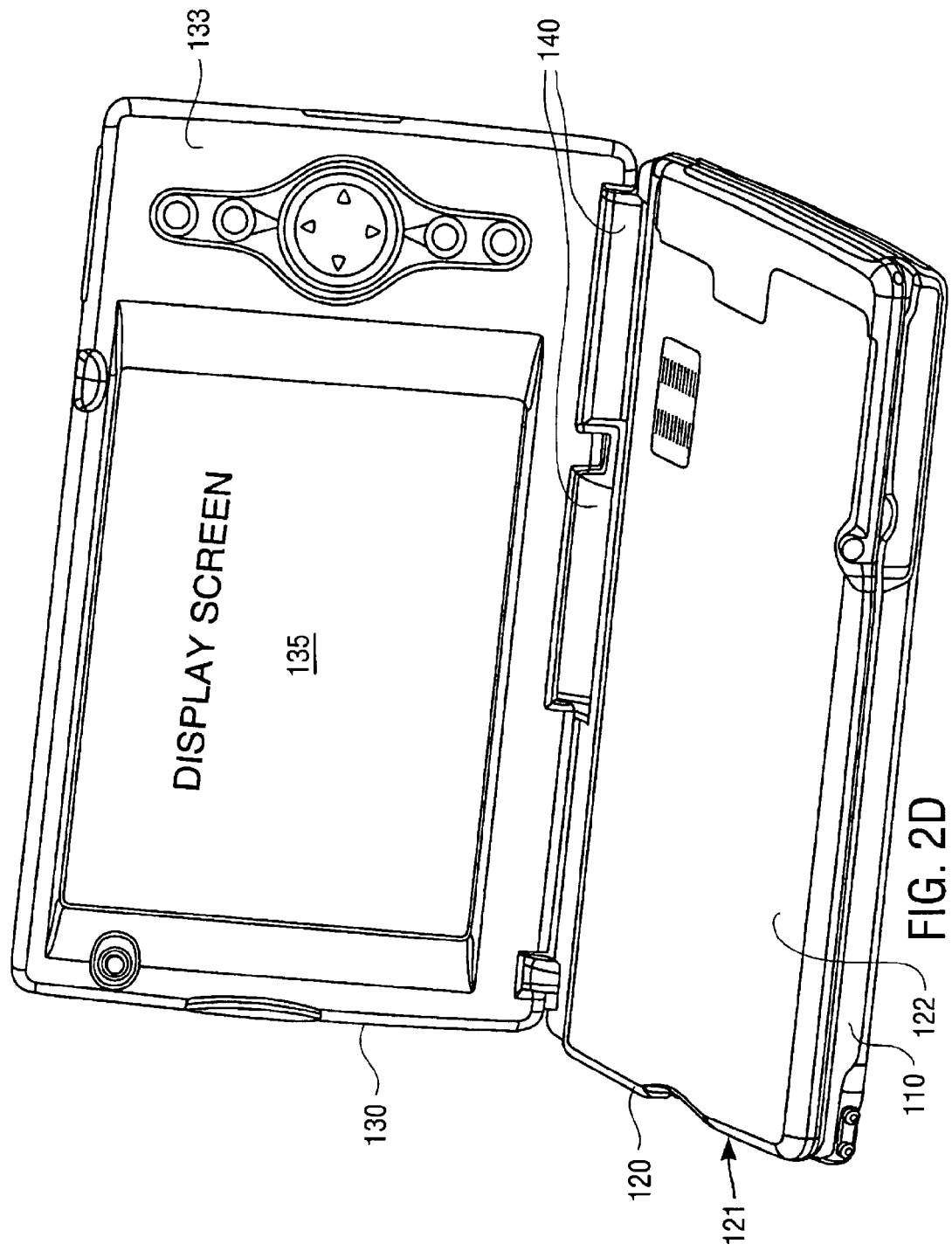
FIG. 2D illustrates one embodiment of the digital processing device with a keyboard assembly folded in one configuration.

With the digital processing device 100 in this first configuration, it may be necessary to prevent a user from mistakenly entering data and/or commands using the keyboard assembly 120. As such, the keyboard assembly 120 may be folded in the first configuration 121, illustrated in FIG. 2D, to prevent unintentional interaction through the keyboard, as discussed below. In one embodiment, a power button 139 may be located external to the keyboard assembly 120 (e.g., on the display assembly 130) to enable the digital processing device 100 to be turned on or off when the keyboard assembly 120 is in the folded position.

Figure 2E:
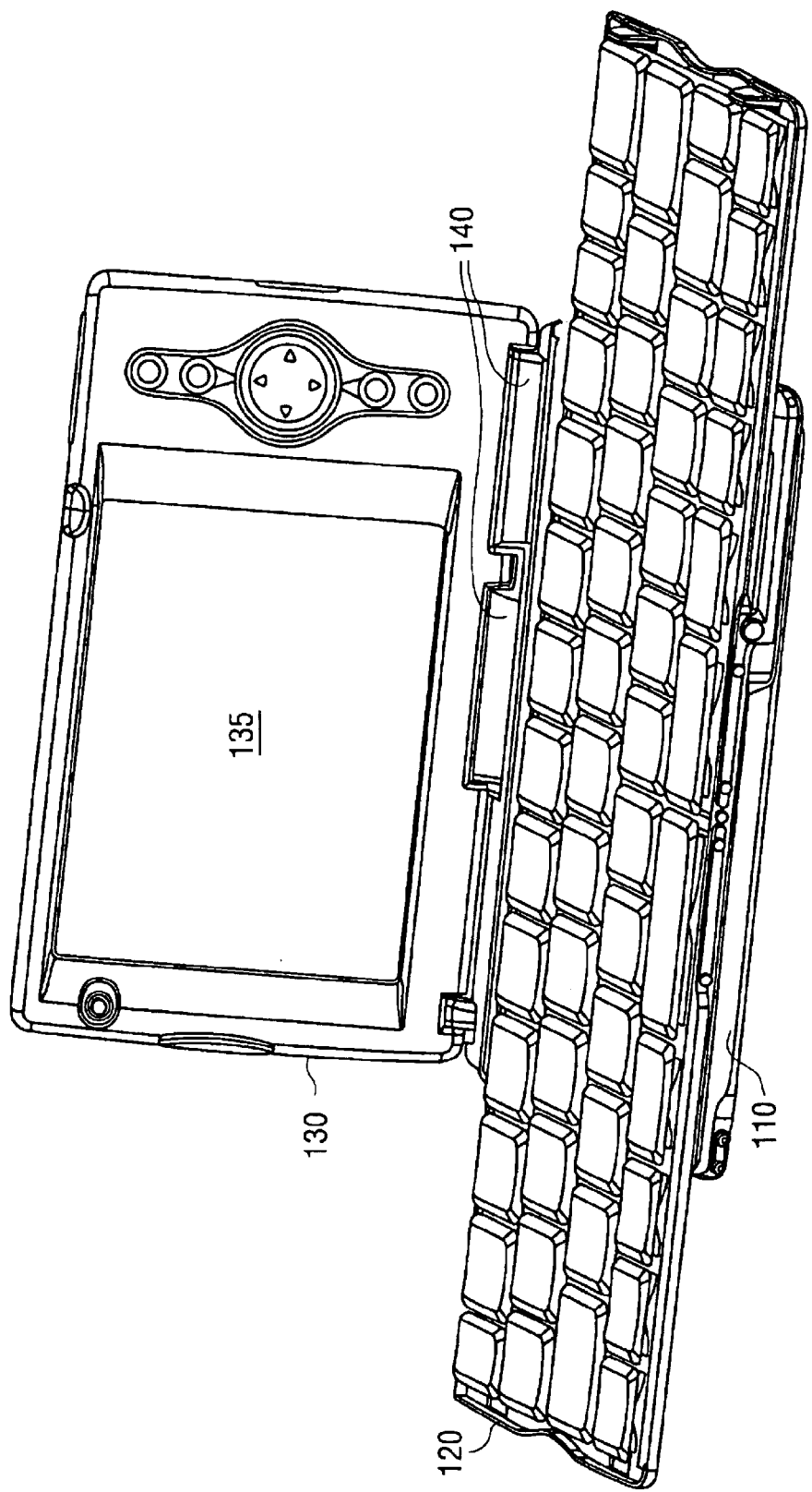
FIG. 2E illustrates one embodiment of the digital processing device with a keyboard assembly unfolded in another configuration.

The hinge assembly 140 enables the display assembly 130 to be rotated to a second configuration with an angle up to 180 degrees between the front 133 of the display assembly 130 and the keyboard assembly 120. For example, the display assembly 130 may be rotated such that it forms approximately a 90 degree angle with the base 110, as illustrated in FIG. 2E. In this second configuration (e.g., with the keyboard assembly fully unfolded), the digital processing device 100 may be used in a similar manner to a portable computing device such as a laptop or notebook computer. In the second configuration, information is displayed to the user in a landscape mode that is oriented 90 degrees relative to the portrait mode. In other words, the keyboard assembly 120 is accessible to the user to enter information by typing and the display assembly 130 is positioned for viewing of information (e.g., information that is entered by a user, information retrieved from a remote system on a network, etc.) oriented parallel with a longest side of display assembly 130. It should be noted that the hinge assembly enables the display assembly 130 to be rotated approximately 360 degrees relative to keyboard assembly 120.

Referring to FIG. 2C, in one embodiment, hinge assembly 140 includes two hinges 141 and 142. Each of hinges 141 and 142 operate as a linkage in the hinge assembly 140. One end of hinge 141 is coupled to base 110 at pivot axis 161. The other end of hinge 141 is coupled to display assembly 130 at pivot axis 163. One end of hinge 142 is coupled to base 110 at pivot axis 162 and the other end of hinge 142 is coupled to display assembly 130 at pivot axis 164. The hinges 141 and 142 are coupled to base 110 at different pivot axes 161 and 162, respectively, that are offset from each other. In one exemplary embodiment, for a display panel having a thickness of 6 mm, the offset may be 2 mm. The hinges 141 and 142 are coupled to display assembly 130 at different pivot axes 163 and 164, respectively, that are offset from each other.

Figure 2F:
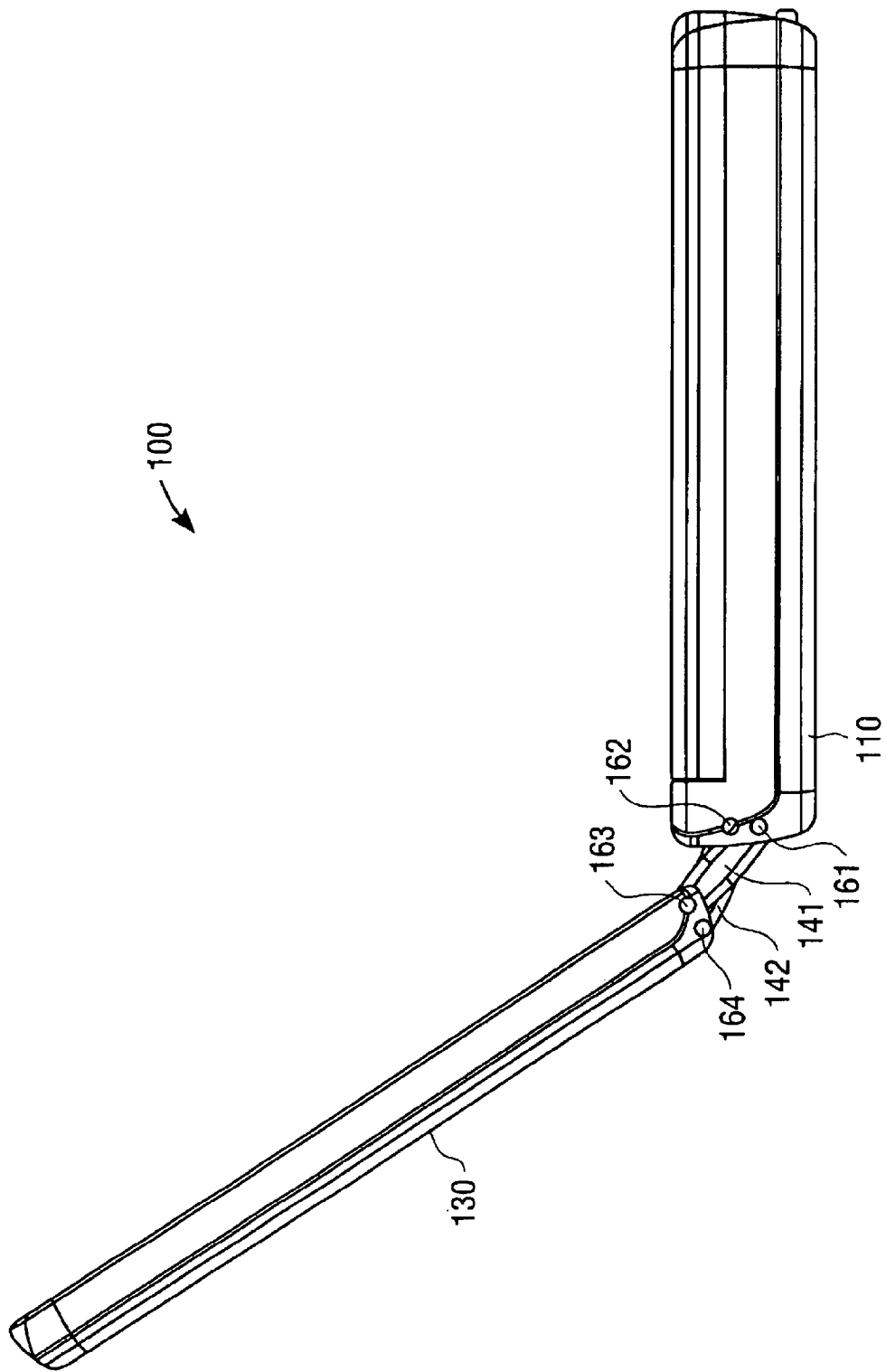
FIG. 2F is a side view illustrating one embodiment of the hinge assembly of the digital processing device.

In this manner, hinges 141 and 142 are cross-connected between base 110 and display assembly 130 relative to their connection points on base 110 and display assembly 130, as illustrated in FIG. 2F. The cross-connection results in a total of four pivot axes 161–164 that allows for rotation of the base 110 and display assembly 130 without any substantial translation of them with respect to each other, as occurs with some prior art two pivot axes hinge assemblies. The cross-connection of hinge assembly 140 generates a common axis of rotation between the base 110 and the display assembly 130. In one embodiment, the distance 167 between the base pivot axes 161 and 162 is the same as the distance 168 between the display assembly pivot axes 163 and 164. Device 100 may also include additional one or more additional hinges (e.g., hinge 143) coupled between base 110 and display assembly 130.

In one embodiment, each of hinges 141 and 142 has pins on their end sections for coupling with corresponding pin holes on base 110 and display assembly 130 to receive the pins. This allows for pivoting of the hinges 141 and 142 about the particular axis 161–164 through use of the pin/pin hole connection. In one embodiment, one or both of hinges 141 and 142 contains a cavity that may contain a flex circuit for carrying electrical signals between components in base 110 and display assembly 130. In alternative embodiments, the hinge assembly of digital processing device 100 may have other cross-connection configurations, for example, hinge assembly 170 as discussed below in relation to FIG. 2F.

Figure 2G:
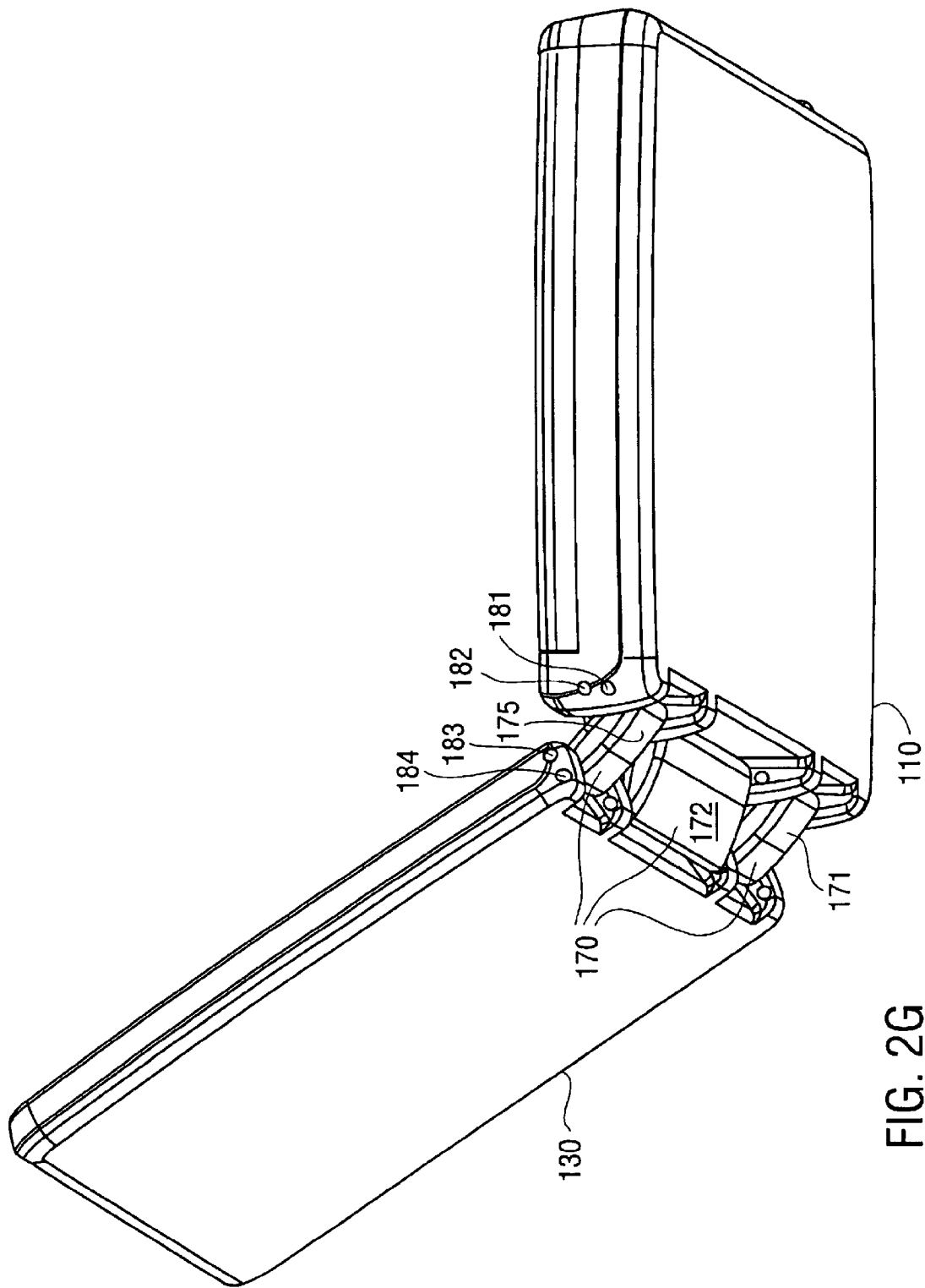
FIG. 2G illustrates an alternative embodiment of the hinge assembly of the digital processing device.

FIG. 2G illustrates an alternative embodiment of hinge assembly on a digital processing device. In one embodiment, digital processing device 100 includes a hinge assembly 170 having inner hinge 172 and outer hinges 171 and 173. One end of inner hinge 172 may be coupled to base 110 at pivot axis 182 and the other end of inner hinge 172 may be coupled to display assembly 130 at pivot axis 184. The ends of outer hinges 171 and 173 that are coupled to base 110 may be coupled to pivot axis 181 and the other ends of outer hinges 171 and 173 that are coupled to display screen 130 may be coupled to pivot axis 183. In this manner, outer hinges 171 and 173 are cross-connected with respect to inner hinge 172 between base 110 and display assembly 130 relative to their respectively connection points on base 110 and display assembly 130. In other embodiments, other configurations for a cross-connected hinge assembly may be used. As yet another example, the hinge assembly may include two outer hinges coupled to base 110 and display assembly 130 in a cross-connected manner without an inner hinge. It should be noted that yet other types of hinge assemblies known in the art may be used, such as hinge assemblies without cross-connected hinges.

Referring again to FIG. 2A, in one embodiment, the foldable keyboard assembly 120 includes two keyboard panels 122 and 124 that are adjustably coupled to base 110. The keyboard assembly 120 also includes a linkage mechanism 125 that operates to slide the bottom panel 124 in response to rotation of the top panel 122 in order to reconfigure the device 100 from a working position illustrated in FIG. 2E to a closed position illustrate in FIG. 2D. The linkage mechanism 125 also operates to center the adjoining edges 126 and 128 of the panels 122 and 124, respectively, over the base 110 when the keyboard assembly 120 is completely unfolded. The keyboard assembly 120 includes another linkage mechanism 129 to fold a cover 126 over a section of the bottom panel 124 exposed by the top panel 122 when the top panel 122 is in a folded position over the bottom panel 124. Details of the linkage mechanisms are discussed in more detail below with respect to FIG. 3A.

In one embodiment, each of the keyboard panels 122 and 124 has an area smaller than the area of the base 110. For example, each of the keyboard panels 122 and 124 has a length 192 and 194, respectively, that is no greater than the length 193 of the base 110 to allow for the keyboard assembly 120 to be folded to a length that fits within the length 193 of the base 110.

Moreover, in the embodiment where base 110 is rigid, the device 100 does not need to be placed on a hard surface for use of the keyboard as is required with prior art devices that utilize a flexible folding keyboard. In one embodiment, for example, the base 110 may be constructed from a plastic material of sufficient thickness to provide rigidity. Alternatively, other materials (e.g., metal) of sufficient thickness may be used for base 110. In alternative embodiment, base 110 may be a non-rigid base.

Because consumer acceptance of devices may be based on their ease and familiarity of use, the foldable keyboard assembly 120 is designed to be larger, when unfolded, than keyboards on prior hand-held computing devices. Moreover, the mechanical action of the keyboard mechanism of the keyboard assembly 120 is designed to feel similar to a desktop keyboard so that the user can touch-type quickly, comfortably, and accurately in an accustomed manner with no leaning required. The keys of, for example, an 84-key keyboard are arranged in the standard "QWERTY" layout. In one embodiment, the keyboard assembly 120 unfolds to conform with an ISO 9241–4:1998(E) 6.2.1/6.2.3 standard for keyboards. This may allow a user to comfortably, quickly, and accurately "touch-type" in a manner that the user may be accustomed to. The keys may have full-sized tops whose center-to-center spacing (referred to as pitch) is at least 18 mm horizontally and 18 mm vertically. In one particular embodiment, both the horizontal and vertical center-to-center spacing is approximately 18 mm.

In one embodiment, the length (panel length 194 plus panel length 192) of the keyboard assembly 120 (i.e., the distance from the left edge of the left-most key to the right edge of the right-most key) is approximately 11 inches. Any reduction in this spacing as is found on prior devices may slow down and frustrate the touch-typist. Additionally, the keys of keyboard assembly 120 have sufficient "travel" (i.e., the vertical displacement of the key when it is pressed) tactile feedback, and an over-center buckling action that signals the user that the key has been pressed sufficiently. For example, in one embodiment, the keys of keyboard assembly 120 have a travel of approximately 1.5 mm to 6 mm and the maximum force to depress a key is approximately in the range of 0.25 N to 1.5 N. In one particular embodiment, the key travel is approximately 3 mm. When a key is pressed there is also an over-center "buckling" of an elastomeric spring to create tactile feedback similar to the feedback provided by high-quality keyboards.

Figure 2H:
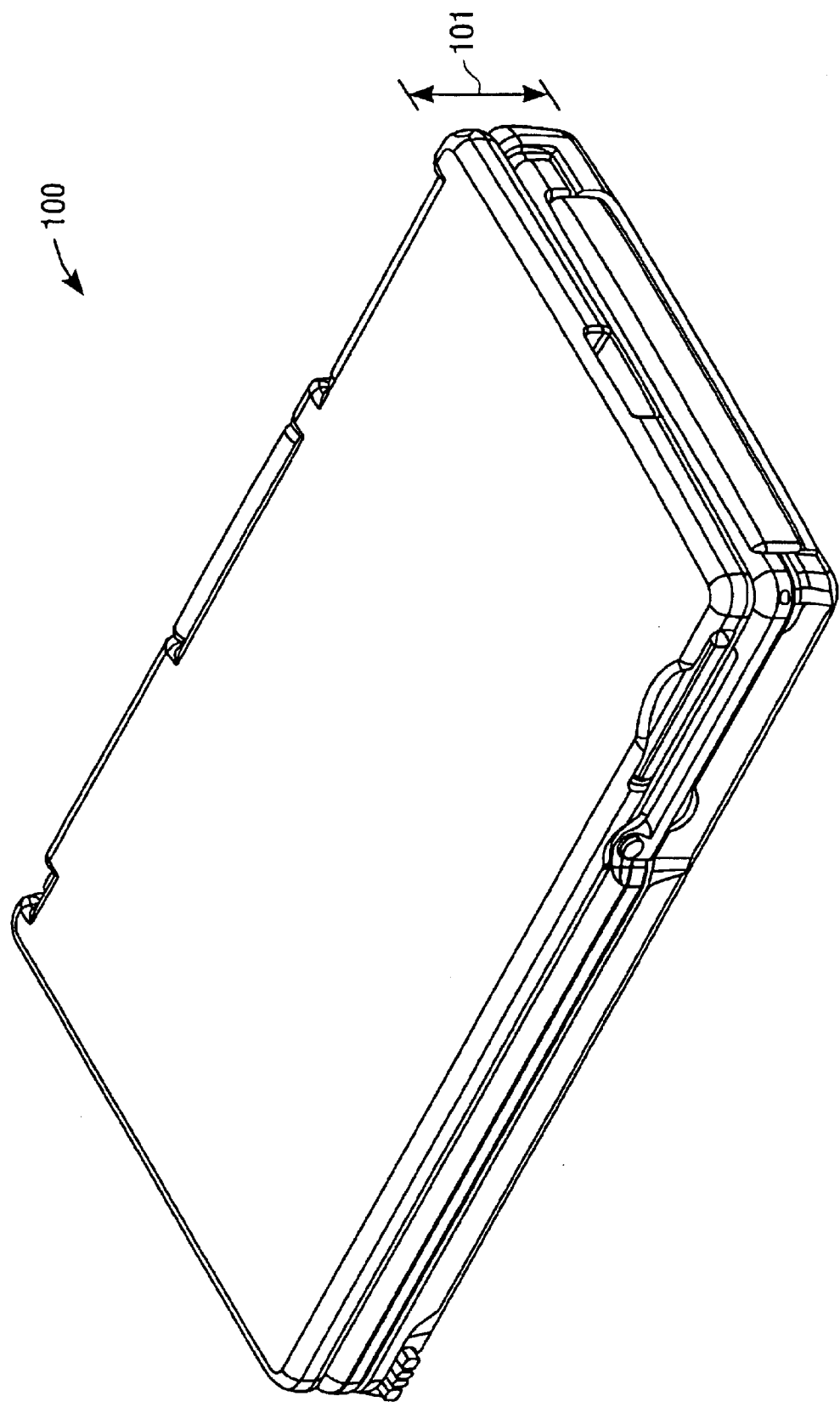
FIG. 2H illustrates one embodiment of the digital processing device in a folded configuration.

As previously noted, the keyboard assembly 120 is capable of collapsing into its own protective housing formed by the base 110 and the back of top keyboard panel 122. When the housing is closed (configuration 121 of FIG. 2D), it forms a dust-proof enclosure surrounding the keyboard assembly's mechanism. When the keyboard assembly 120 is in its collapsed position or state, the length is approximately 138 mm, the width is approximately 74 mm, and the height or thickness of the keyboard assembly is approximately 6 mm. In one embodiment, the thinness of the keyboard assembly 120, in a collapsed state, enables the total thickness 101 of the digital process device 100 to be less than 20 mm, as illustrated in FIG. 2H. This allows for the device to be more easily carried in a purse or pocket.

Expanding the keyboard assembly 120 from a collapsed state to a keyboard having conventionally spaced keys is done in a single step in one embodiment of the invention. The user simply pulls the keyboard assembly's top panel 122 apart from the bottom panel 124.

Figure 7:
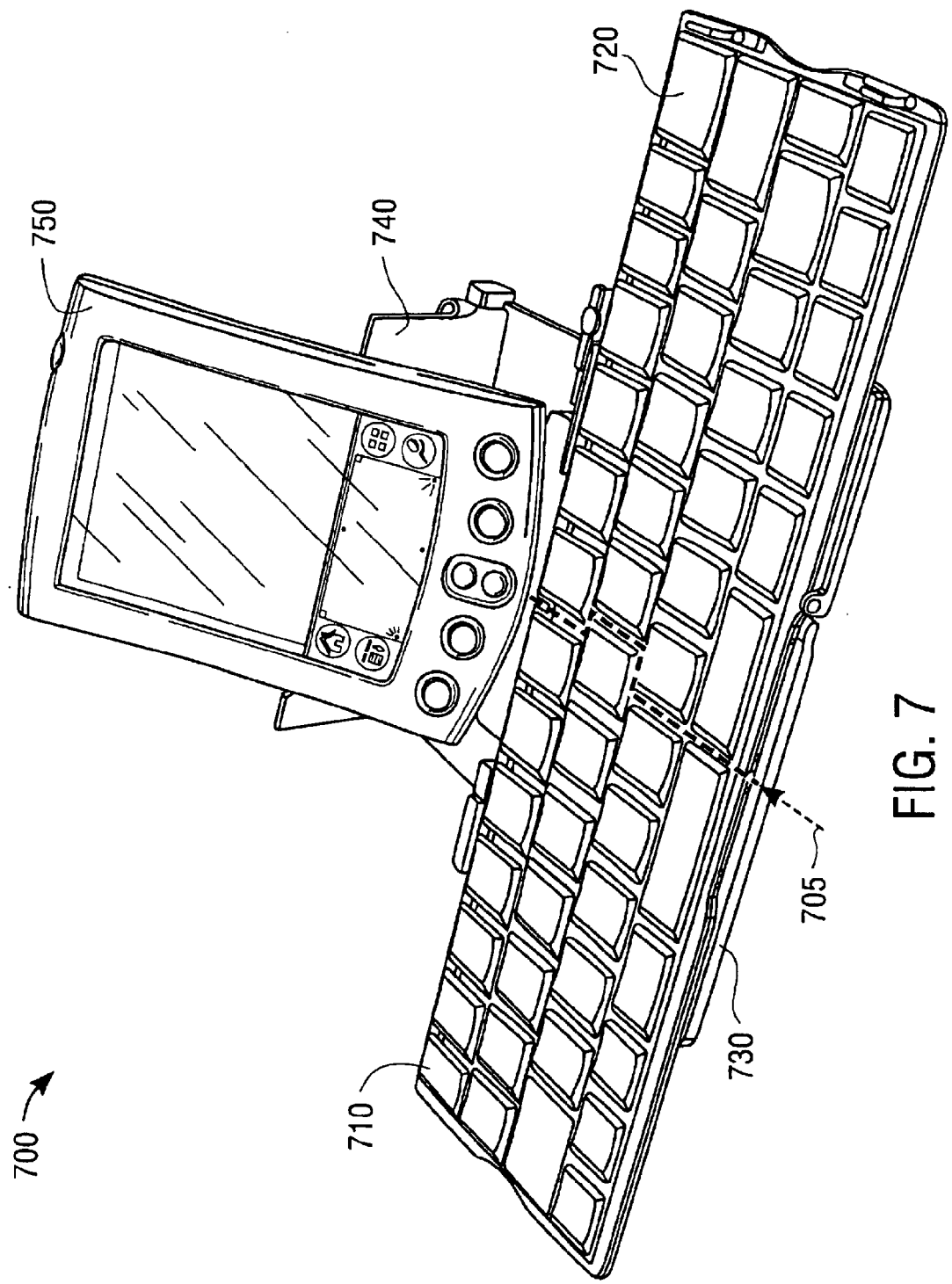
FIG. 7 illustrates one embodiment of an unfolded keyboard assembly digital processing device

FIG. 7 illustrates a top perspective view of an embodiment of an unfolded keyboard assembly configured with a personal digital processing device. The keyboard assembly includes first keyboard assembly 710, second keyboard assembly 720, support plate 730, and connector 740. In one embodiment, the parts of the keyboard assembly are in continuous contact with each other. Division line 705 shows where first keyboard section 710 and second keyboard section 720 divide when the keyboard assembly folds.

Figure 6:
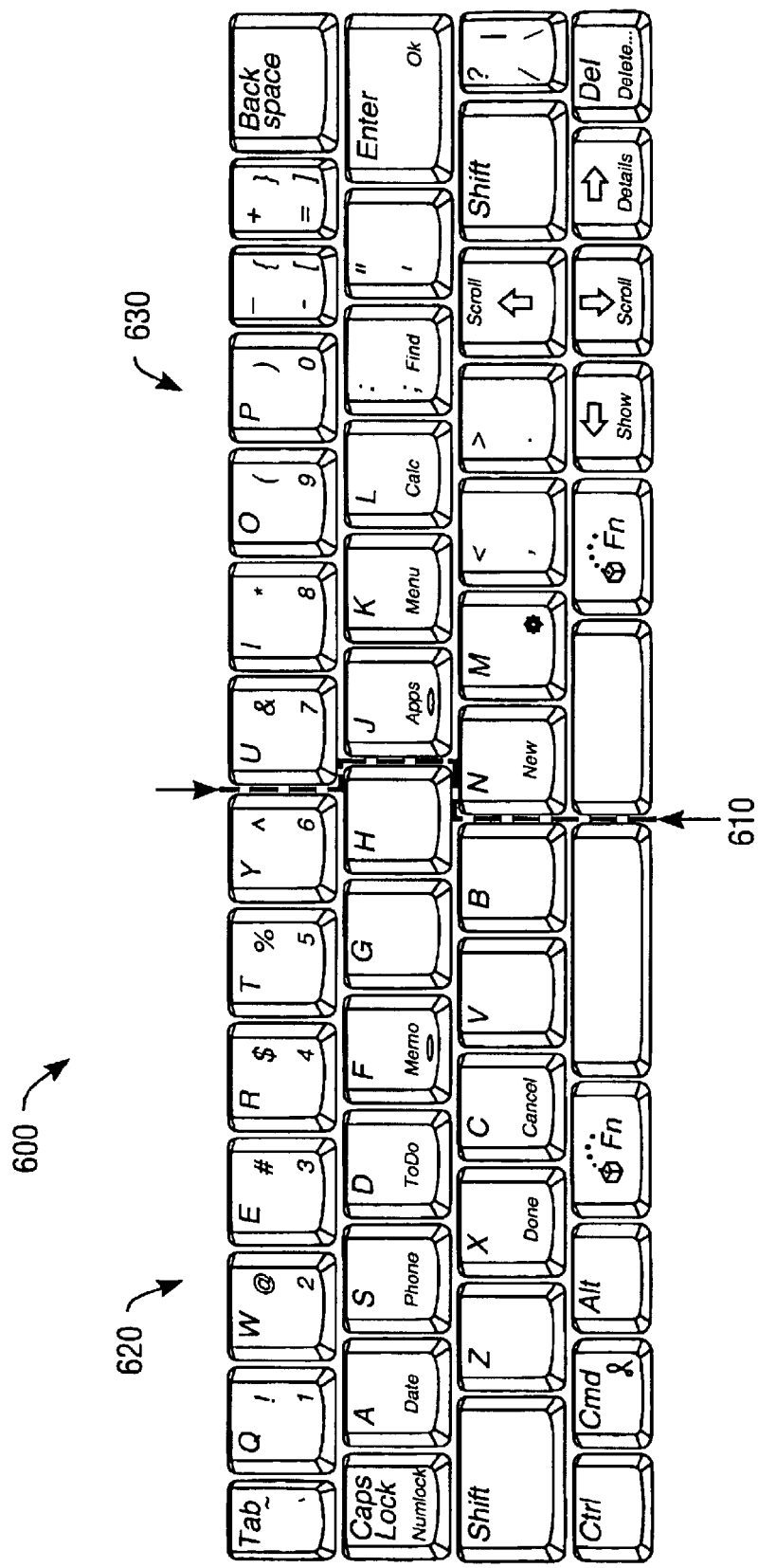
FIG. 6 illustrates a standard QWERTY keyboard layout.

In one embodiment, keyboard sections unfold to a full-size, standard "QWERTY" layout. "QWERTY" is indicative of the keyboard layout in that the first six letters of the top row, in a direction from left to right, are Q-W-E-R-T-Y. The key tops of a keyswitch assembly comply with full size standards (e.g., about 18–19 mm center to center horizontal pitch, about 18–21 mm center to center vertical pitch, and a minimum horizontal strike surface width of about 12 mm). FIG. 6 illustrates one embodiment of standard QWERTY layout with a complete set of keys. The overall arrangement of the keys results in a rectangular layout. The keys corresponding to letters are about substantially the same size, while function keys (e.g., "Shift" and "Enter") may be of varying sizes. Line 610 shows the jagged division separating first keyboard section 620 from second keyboard section 630. The division exists between the letters "Y" and "U," "H" and "J," "B" and "N", and between the space bar.

Full-size keyboards allow the user to comfortably, privately, and quickly "touch-type." They have a number of desirable features. Importantly, the keyswitches may be designed to provide sufficient "travel" (i.e., the distance the key moves when it is pressed), and tactile feedback (i.e., an over-center buckling action), that signals to the user that the key has been pressed sufficiently.

When users type quickly with all fingers, they often strike the keys off center. To prevent the keys from binding, high quality keyswitches use mechanisms that keep the key caps parallel to the base as they are pressed. This allows the keys to be struck on any portion of their surface and at non-perpendicular angles to the direction of depression. Co-pending U.S. patent application Ser. No. 09/738,000, filed Dec. 14, 2000, entitled "Keyswitch," describes an example of a keyswitch assembly for use in keyboards. Co-pending U.S. patent application Ser. No. 09/737,015, filed Dec. 14, 2000, entitled "Spring," describes an example of a spring for use in keyswitch assemblies. Both applications are hereby incorporated herein by reference. U.S. provisional application No. 60/359,596 entitled "Mobile Computer with Foldable Keyboard," filed Feb. 25, 2002, is also incorporated herein by reference.

Referring again to FIG. 7, in a QWERTY layout, keyboard sections 710, 720 may not be divided evenly down the exact center of the unfolded keyboard. Nevertheless, first keyboard section 710 and second keyboard section 720 have substantially similar sizes, with substantially equal width, length, and thickness. Also, the support plate 730 has substantially the same width and length.

In one embodiment, support plate 730 may overlap first keyboard section 710 and second keyboard section 720 in the unfolded configuration. Support plate 730 may also be substantially the same size as the two keyboard sections 710, 720, with substantially equal width, length and thickness. In one embodiment the thickness of the two keyboard sections 710, 720 and the support plate 730 may be in the range of about 2 mm to about 6 mm, although the support plate may be thicker than the two keyboard sections, such as is shown in the exemplary embodiment of FIG. 4B, and the keyboard sections may be thinner than about 2 mm. The lengths of the two keyboard sections 710, 720 and the support plate 730, in certain embodiments, may be in the range of about 6 cm to about 15 cm. As shown in the exemplary embodiment of FIG. 4C, the lengths of these three components may be virtually the same or substantially the same. The widths of the two keyboard sections and the support plate, in certain embodiments, may be in the range of about 4 cm to about 12 cm.

In a particular embodiment, the support plate or base plate 730 (which may house the CPU, battery, and other electrical components) has a thickness up to about 8 mm. Without the CPU, battery and other electrical components, the thickness may be up to about 5 mm. The keyboard sections 710, 720 (each section, when the keyboard is in a collapsed position) have a thickness of about 3 mm. Support plate or base plate 710 has a width of about 74 mm and a length of about 138 mm, and each keyboard section 710, 720 has a width of about 74 mm, and a length of about 138 mm. Support plate 730 does not extend across the entire length of the unfolded keyboard, but overlaps a portion of each keyboard section 710, 720. In one embodiment, support plate overlaps 730 each keyboard section substantially equally. This configuration may provide the optimal configuration for a user to use all the keys of the unfolded keyboard comfortably. Support plate 730 aligns along a length of keyboard sections 710,720 in the unfolded configuration. Support plate 730 is coupled to keyboard sections 710, 720 along the length of keyboard sections such that from a top view, support plate 730 is not visible.

In one embodiment, the keyboard assembly folds and unfolds in the following manner. In the unfolded, fully extended configuration (e.g., the configuration shown in FIGS. 7, 3A or 4A), support plate 730 overlaps equally first keyboard section 710 and second keyboard section 720, such that portions of first keyboard section 710 and second keyboard section 720 extend past the length of support plate 730. First keyboard section 710, second keyboard section 720 and support plate 730 may be in continuous contact with each other and are substantially similar in size. In addition, first keyboard section may be coupled to support plate 730 by sliding rails along at least a portion of the length of first keyboard section 710.

From the unfolded configuration, second keyboard section 720 folds or rotates toward first keyboard section 710. The folding region between first keyboard section 710 and second keyboard section 720 may be jagged division 705. During this motion, first keyboard section slides along support plate 730 towards an end of support plate 730 (e.g., towards the right side of support plate 730), such that first keyboard section 710 aligns over support plate 730 without any portion of first keyboard section extending past a length of support plate 730. Second keyboard section 720 aligns over first keyboard section 710 without any portion of second keyboard section 720 extending past a length of first keyboard section 710. As such, because first keyboard section 710, second keyboard section 720, and support plate 730 are of substantially equal size and shape, when folded, all three parts align over each other.

The mechanics of folding second keyboard section 720 and sliding first keyboard section 710 are, in one embodiment, tied together such that any distance second keyboard section 720 folds or rotates, first keyboard section 710 slides by a corresponding distance. This way, completely unfolding second keyboard section results in first keyboard section sliding along support plate 730 such that support plate 730 extends over first keyboard section 710 and second keyboard section 720 equally. Completely folding second keyboard section 720 over first keyboard section 710 results in first keyboard section 710, second keyboard section 720, and support plate 730 aligning over each other to give the appearance of a unitary body. Second keyboard section 720 may rotate up to 180 degrees with respect to first keyboard section 710 to change between a folded and unfolded keyboard configuration.

Thus, keyboard assembly 700 may be defined as having two main keyboard configurations. One main configuration is an unfolded, or open configuration in which the two keyboard sections are fully exposed, co-planar and coupled to each other to form a full-size QWERTY layout keyboard having full size key tops. Support plate 730 overlaps each keyboard section substantially evenly underneath the keyboard sections to provide a rigid base for keyboard use.

The other main keyboard configuration is the folded or closed configuration, in which one keyboard section folds with respect to each the other such that the keys (and hence the key tops of the keys) from each keyboard section oppose each other. First keyboard section 710, second keyboard section 720, and support plate 730 align on top of each other to form a unitary body. To make the folded keyboard sections as thin as possible, the keys may be fully depressed in the folded configuration (such that the keyswitches of each key are electrically shorted). In the folded configuration, a bottom surface of support plate 730 and a bottom surface of second keyboard section 720 form the exterior of a self-contained housing for the keyboard assembly. In the folded configuration, because none of the keys are exposed, the self-contained housing protects the keys of the keyboard sections. In addition, the footprint of the folded keyboard, in one embodiment, may be small enough to fit comfortably in a shirt pocket or in the palm of the user's hand for carrying from one location to another.

In one embodiment, connector 740 may be coupled to the keyboard assembly. Connector 740 provides for electrical connection between the keyboard and the personal processing device, such as a personal digital assistant (PDA). Electrical signals, such as key codes that identify keystrokes, may be sent from the keyboard to the personal processing device. Support plate 730 is coupled to connector 740. A personal processing device may be electrically and mechanically coupled to connector 740 in the unfolded configuration.

Figure 7A:
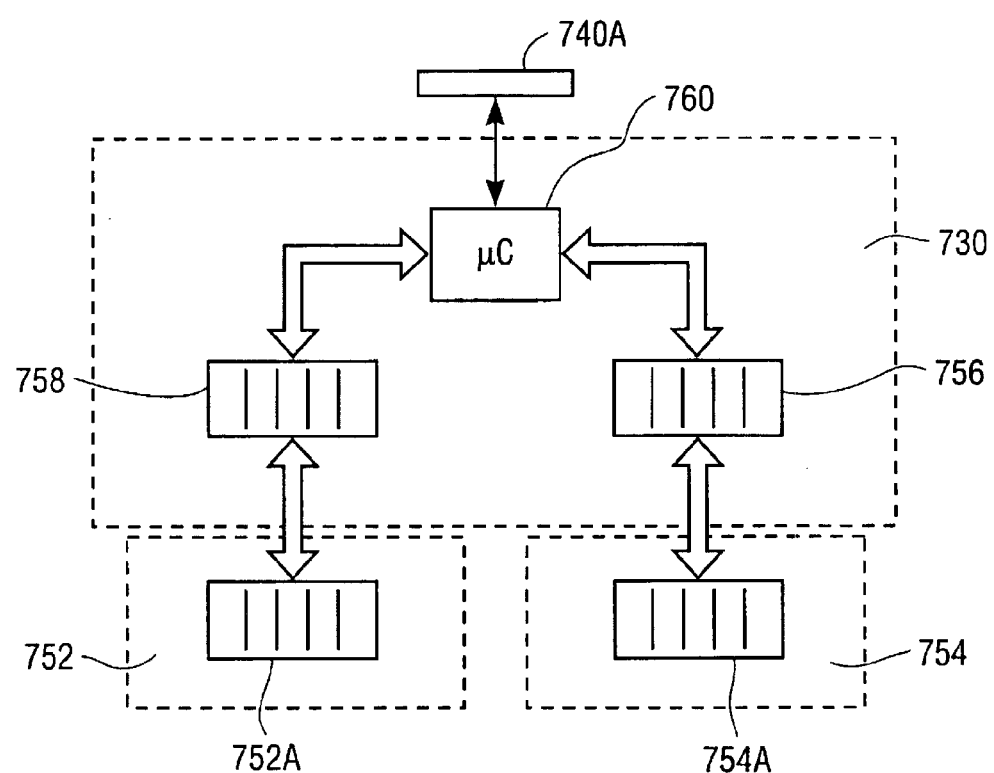
FIG. 7A illustrates one embodiment of a conductive strip arrangement on a foldable keyboard.

Two groups (first and second groups) of conductive strips may be fixed on the inner surface of support plate 730 (which faces the bottom sides of the keyboard sections in the unfolded configuration) and a first and a second corresponding group of conductive strips may be attached to the bottom side of the first and second keyboard sections respectively. An example of this arrangement is shown in FIG. 7A. In the unfolded configuration, the first corresponding group of conductive strips on the first keyboard section (e.g., strips 752A in FIG. 7A) electrically contacts the first group of conductive strips (e.g., strips 758) on the inner surface of support plate 730, thereby allowing for electrical connection of signals between the first keyboard section (e.g., section 752 of FIG. 7A) and a keyboard controller which scans the electrical matrix of keyswitches in each section, such as keyboard controller 760 shown in FIG. 7A.

Similarly, the second corresponding group of conductive strips (e.g., strips 754A of FIG. 7A) on the second keyboard section (e.g., section 754) electrically contacts the second group of conductive strips (e.g., strips 756) on the inner surface of support plate 730, thereby allowing for electrical connection of signals between the second keyboard section and the keyboard controller (e.g., controller 760 of FIG. 7A).

When the two keyboard sections are moved from the unfolded to the folded configuration these electrical connections are, in this embodiment, disconnected. The sets of conductive strips allow for the folding and unfolding without requiring a flexible electrical cable; however, in one alternative embodiment, a flexible electrical cable (which allows for the folding and unfolding) may connect each keyboard section to the keyboard controller (e.g., controller 760) which may be disposed on the support plate 730. The controller 760 is electrically coupled to electrical contractor 740A which is part of connector 740 and provides keystroke signals, identifying individual keys which have been depressed as a user types, to the connector 740 which in turn provides these signals to the PDA connected to the connector 740. It will be appreciated that the controller 760 may scan a conventional electrical matrix of keyswitches in the two keyboard sections in a conventional manner. It will also be appreciated that, in an alternative embodiment, the keyboard controller may be disposed in the PDA and may scan the electrical matrix of keyswitches through electrical contractor 740A.

Figure 7B:
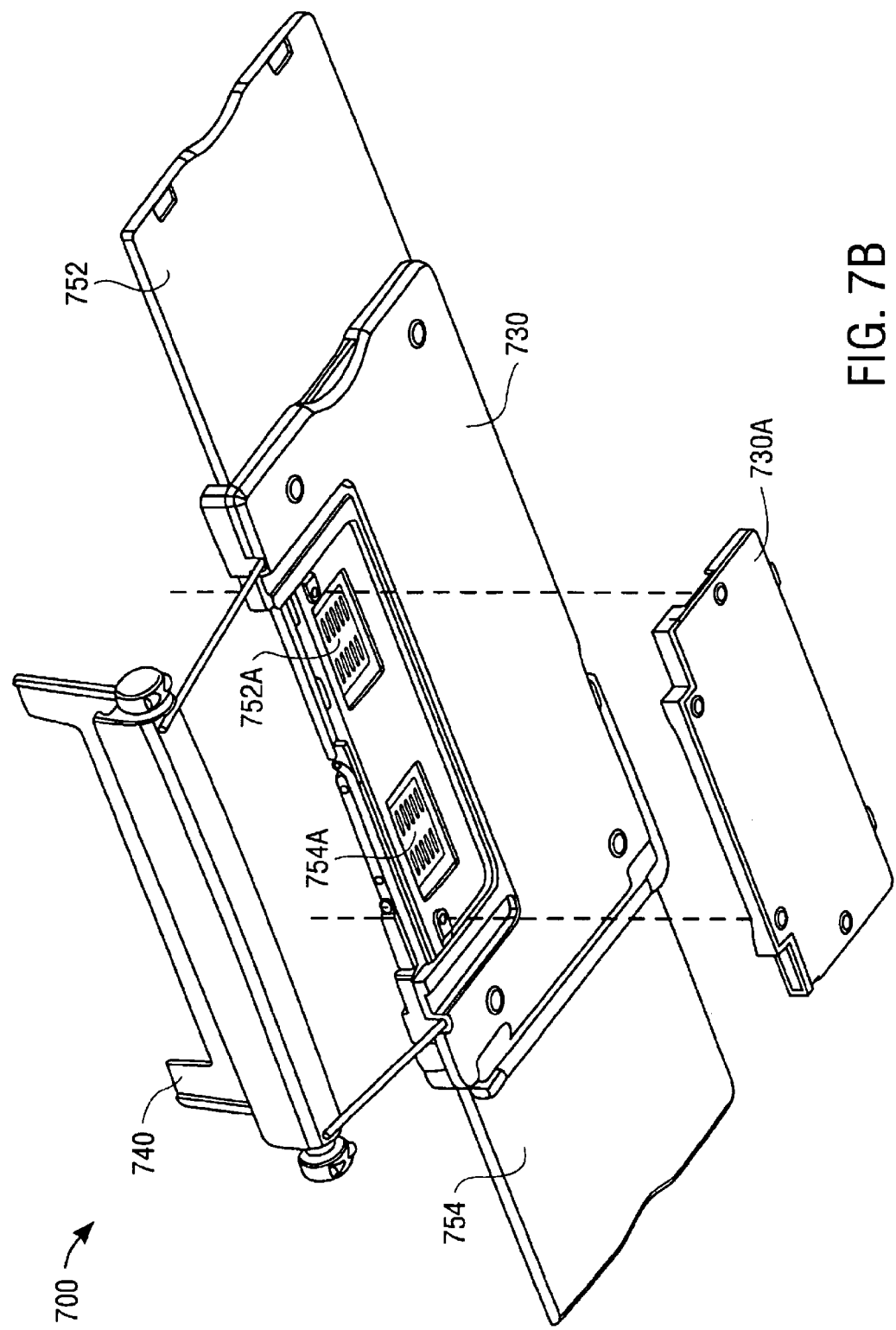
FIG. 7B illustrates another embodiment of a conductive strip arrangement on a foldable keyboard.

FIG. 7B illustrates one embodiment of an arrangement of conductive strips in the unfolded configuration, viewed from the bottom side of keyboard assembly 700. First keyboard section 752 has conductive strips 752A disposed above and within an area of support plate 730. Second keyboard section 754 also has corresponding conductive strips 754A disposed above and within an area of support plate 730. Connector 740 is shown coupled to support plate 730, and in an extended position to support a PDA or similar device.

Support plate segment 730A is shown in an exploded view with respect to support plate 730. When part of support plate 730, support plate segment 730A overlaps conductive strips 752A of first keyboard section 752 and conductive strips 754A of second keyboard section 754. Conductive strips 756, 758, as well as keyboard controller 760 and connector 740A described with respect FIG. 7A, may be disposed on an inner surface (not shown) of support plate segment 730A. Conductive strips 756, 758 would align with conductive strips 754A, 752A, respectively, allowing for electrical connection of signals of first keyboard section 752 and second keyboard section 754 with keyboard controller 760. As described above, keyboard controller 760 is electrically coupled to electrical contractor 740A, which is part of connector 740, and provides keystroke signals, identifying individual keys that have been depressed as a user types, to the connector 740. Connector 740 in turn provides these signals to the PDA connected to the connector 740.

Figure 3A:
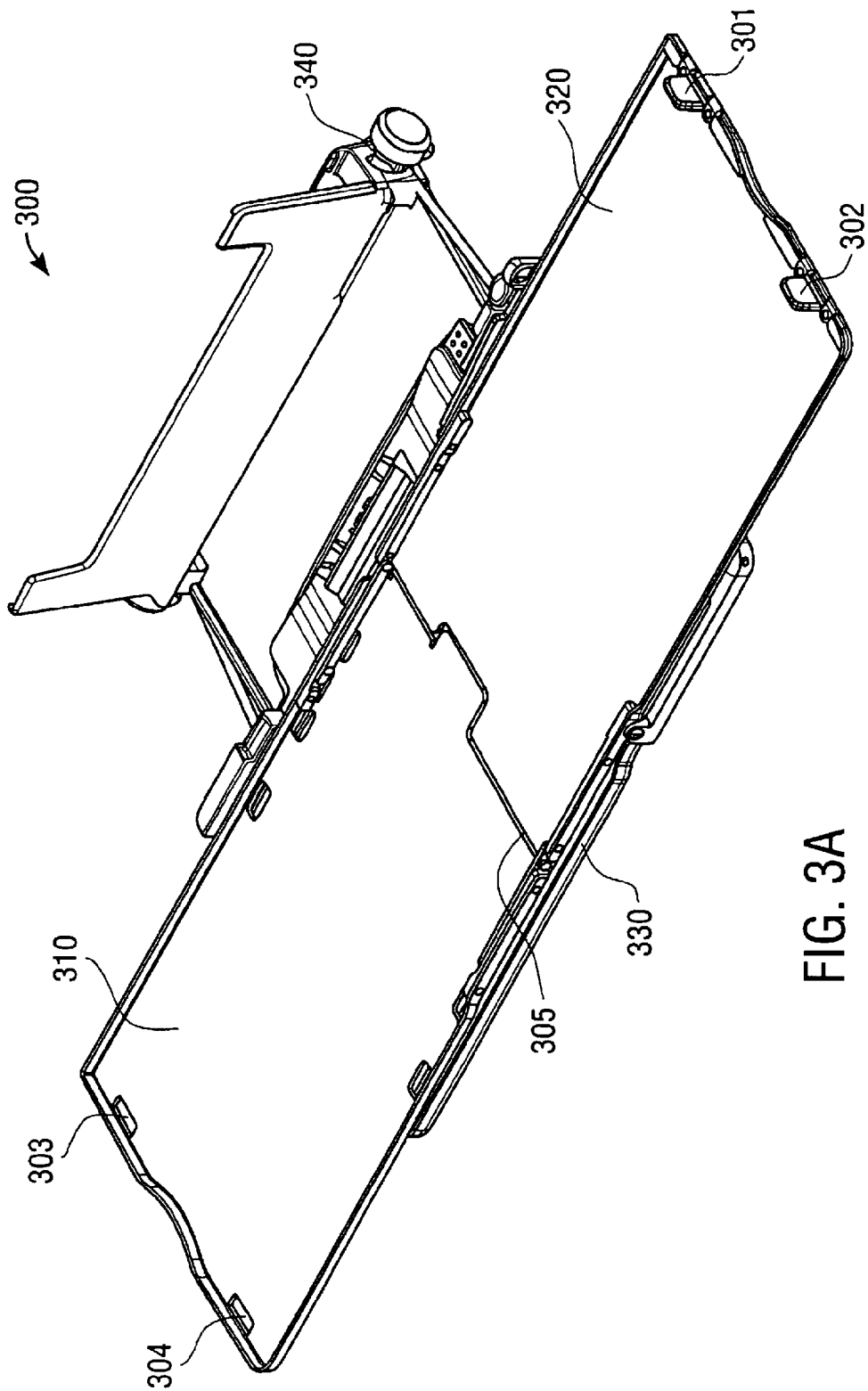
FIG. 3A illustrates one embodiment of a foldable keyboard assembly that may be used with the digital processing devices of FIGS. 2A–2I.

FIG. 3A illustrates one embodiment of a keyboard assembly in the unfolded configuration with a personal processing device connector in an extended configuration. In the unfolded configuration, keyboard assembly 300 has first keyboard section 310, second keyboard section 320, support plate 330 and connector 340. For clarity of description, keyboard sections 310, 320 are shown without the keys. It will be appreciated that these keys are supported on the surfaces of these two sections. First keyboard section 310 and second keyboard section 320 arm divided along line 305. The division between the keyboard sections is not straight because a standard keyboard layout in QWERTY format has rows of keys staggered from one row to the next. Inserts 301, 302 may be disposed near an end of second keyboard section 320. Slots 303, 304 may be displaced on first keyboard section 310 that aligns with inserts 301, 302, in the folded configuration, such that the keyboard sections may be securely coupled together.

In one embodiment, first keyboard section 310, second keyboard section 320, and support plate 330 are substantially equal in size. Support plate 330 overlaps first keyboard section 310 and second keyboard section 320 equally. Because support plate 330 overlaps first and second keyboard sections substantially equally, the unfolded keyboard is supported firmly for comfortable use under a variety of surfaces. Support plate stabilizes the keyboard sections and allows a user to apply an amount of force consistent with the use of any standard-type keyboard. As such, the keyboard assembly provides the advantages of operating comparably to a full-size, unitary keyboard and the portability to use the keyboard under a variety of environments and circumstances.

Figure 3B:
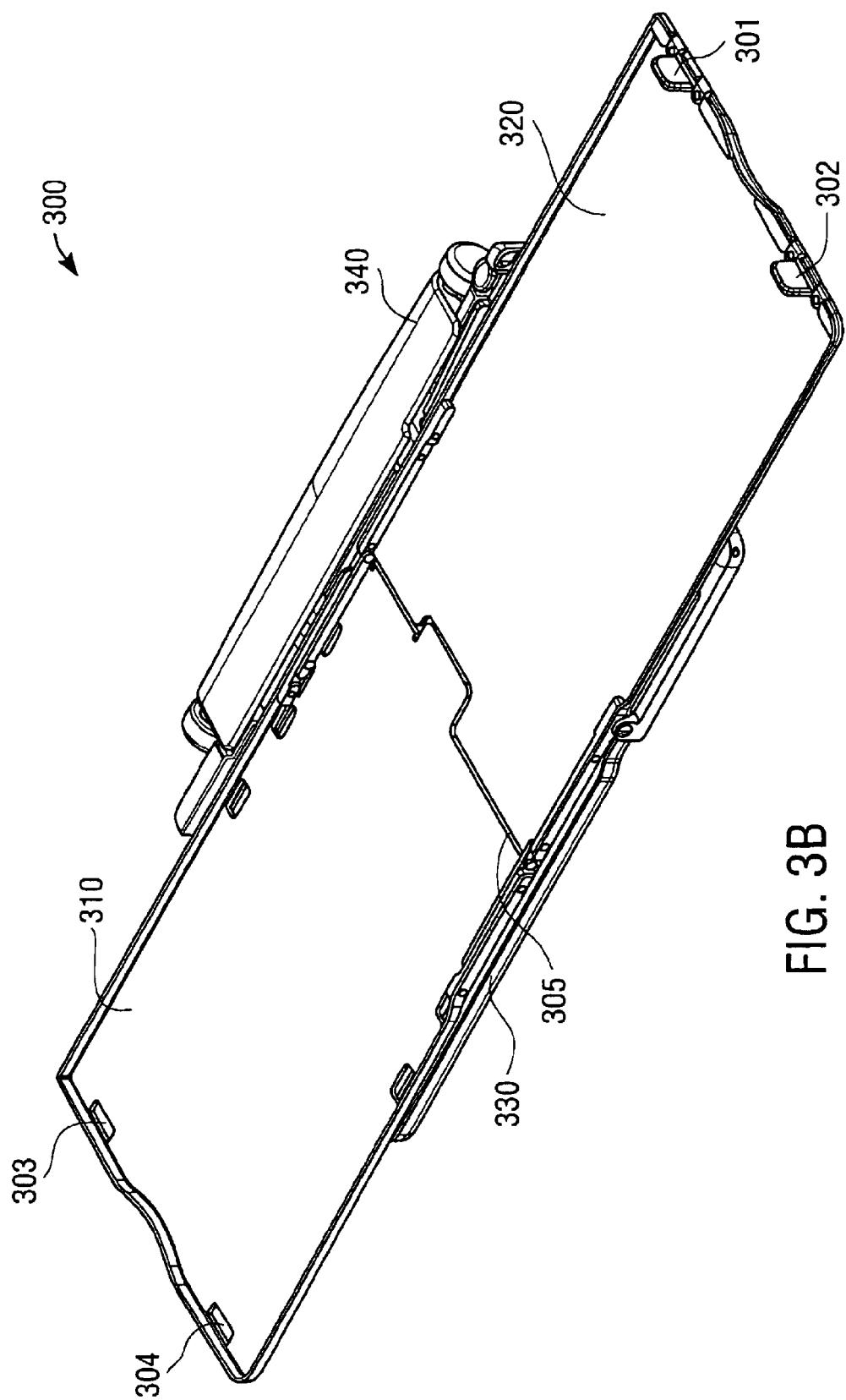
FIG. 3B illustrates one embodiment of a foldable keyboard in another unfolded configuration.

Connector 340 allows the keyboard assembly to attach to a personal digital processor to register keystrokes. Connector 340 is coupled centrally to support plate 330 along a length of support plate 330 on the back side of plate 330 as shown in FIG. 3A. Connector 340 may have an extended configuration to secure a personal digital processor, and a closed configuration, as illustrated in FIG. 3B.

Figure 3C:
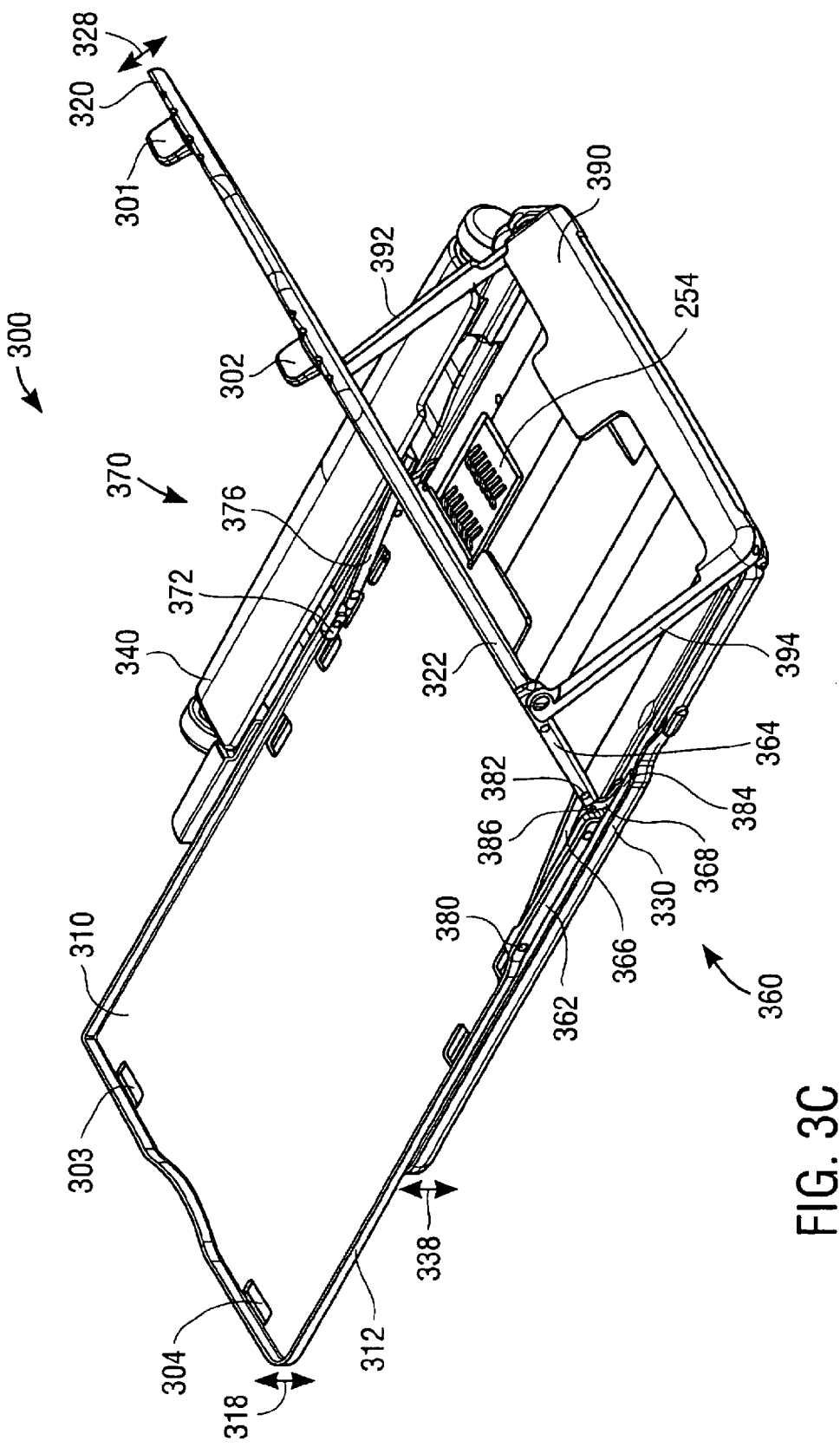
FIG. 3C illustrates one embodiment of a foldable keyboard in a partially unfolded configuration.

FIG. 3C illustrates a perspective view of foldable keyboard assembly 300 in an intermediate configuration that is neither completely folded nor unfolded. In this configuration, foldable keyboard sections 310, 320 are coupled to each other by linkage assembly 360. Linkage assembly 360 serves as the folding mechanism that allows keyboard sections 310, 320 to alternate from a folded configuration to an unfolded configuration. Linkage assembly includes first bar 362, second bar 364, third bar 366, and fourth bar 368. In an alternative embodiment, keyboard assembly 300 may also include second linkage assembly 370 disposed on a side opposite linkage assembly 360. Second linkage assembly 370 may also have first bar 372, second bar 374 (not shown), third bar 376, and fourth bar 378 (not shown). Second linkage assembly 370 may provide additional support and stability to the keyboard assembly, as well as facilitating the folding of the keyboard sections 310, 320. It may be appreciated that second linkage assembly 370 may not be required for keyboard sections 310, 320 to fold and unfold.

First keyboard section 310 has a thickness 318, second keyboard section 320 has a thickness 328, and support plate 330 has a thickness 338. In one embodiment, the thickness of all three parts are substantially equal. A layout of keys (not shown) on first keyboard section 310 and second keyboard section 320 may be compressed (i.e., travel) such that the overall thickness of the keyboard sections with the keys may be substantially the thickness of the keyboard sections.

First bar 362 of linkage assembly 360 is coupled to edge 312 of first keyboard section 310. First bar 362 is coupled along edge 312 near a point where first keyboard section 310 meets second keyboard section 320. For example, in FIG. 3A, division 305 between first keyboard section 310 and second keyboard section 320 is denoted being uneven (e.g., 305). Similarly, second bar 364 is coupled to edge 322 of second keyboard section 320. Third bar 366 is coupled to first bar 362 at first pivot 380, and to second bar 364 at second pivot 382. Fourth bar 368 also couples first bar 362 and second bar 364. One end of fourth bar 368 forms a third pivot with first bar 362 and the other end of fourth bar 368 forms a fourth pivot with second bar 364.

The mechanics of the folding and unfolding of keyboard assembly 300 was described generally above. As will be described in greater detail below, first pivot 380 and second pivot 382 allow keyboard sections 310, 320 to fold and unfold with respect to each other. Third pivot 384 and fourth pivot 386 allow first keyboard section 310 to slide along support plate 330 when keyboard assembly 300 changes from an unfolded configuration to a folded configuration. Thus, the four pivots 380, 382, 384, 386 operate cooperatively to allow the simultaneous folding and unfolding of second keyboard section 320, and sliding of first keyboard section 310.

Optionally, keyboard assembly 300 may include brace 390 to support second keyboard section 320. Arms 392, 394 coupled to edges 322, 324 (note: 324 not shown) of second keyboard section 320 provide rigid support as second keyboard section rotates from a folded to an unfolded configuration. However, it may be appreciated that brace 390 is not essential to allow the folding or sliding of keyboard assembly 300.

Keyboard assembly 300 illustrated in FIG. 3C also shows conductive strip 256 disposed on support plate 330. As described with respect to FIGS. 2A, 2B, conductive strip 256 makes contact with a corresponding conductive strip (e.g., conductive strip 254A) disposed on second keyboard section 320. The connection between the two conductive strips allows for electrical connection of signals between second keyboard section 320 and a keyboard controller (e.g., controller 260 from FIGS. 2A, 2B).

FIGS. 3B–3E illustrate one embodiment showing the range of motion of a keyboard assembly changing from a fully extended, unfolded configuration to a completely folded configuration. Turning now to FIG. 3B, keyboard assembly 300 is illustrated in a fully unfolded configuration with first keyboard section 310 and second keyboard section 320 co-planar with respect to each other, and support plate 330 disposed underneath the keyboard sections and overlapping the keyboard sections 310, 320 equally. First keyboard section 310 and second keyboard section 320 each has top surface 314, 324 respectively for a distribution of keys. The keyboard sections also have a bottom section (not shown) that is generally smooth and rigid. The bottom surface of first keyboard section 310 allows it to slide along support plate 330 and the bottom surface of second keyboard section 320 becomes one side of a self-contained housing when keyboard assembly 300 is in the folded configuration.

In this configuration, linkage assembly 360 has first bar 362, second bar 364, and third bar 366 substantially parallel with each other and substantially parallel to the plane of the keyboard sections. Fourth bar 368 (not shown) maintains a low position such that it stays within a height of first bar 362 and second bar 364. As such, pivots 380, 382, 384, and 386 (not viewable) are substantially parallel to each other. Optionally, linkage assembly 300 may have second linkage assembly 370 described above. With respect to key assemblies (not shown) on the keyboard sections, linkage assembly 360 may be at a height lower than the height of the keycaps, such that none of the linkage assembly bars, including the pivots, interfere with the pressing of keys, when in the unfolded configuration.

FIG. 3C illustrates keyboard assembly 300 in a partially folded configuration. Here, rotating second keyboard section 320 on pivots 384, 386 of fourth bar 368 pulls first keyboard section 310 towards second keyboard section 320 by rotating pivot 382 of third bar 366 coupled to second bar 364. Because third bar 366 is also coupled to first bar 362, first keyboard section 310 slides along support plate 330. In this configuration, pivot 382 moves such that it is raised above first arm 360 and pivot 380.

Thus, a rotational force applied to second keyboard section 320 to fold over first keyboard section 310 corresponds to a horizontal force on first keyboard section 310. First keyboard section 310 slides along rails (not shown) on support plate 330. In this configuration, because second keyboard section 320 is only approximately 25% folded, first keyboard section 310 still extends past support plate 330. Alternatively, this keyboard configuration may be one in which the keyboard is approximately 75% unfolded. In addition, applying a horizontal force on first keyboard section 310 towards second keyboard section 320 may cause second keyboard section 320 to fold toward first keyboard section 310. Thus, the motions of folding and unfolding of keyboard assembly 300 are inter-related.

Figure 3D:
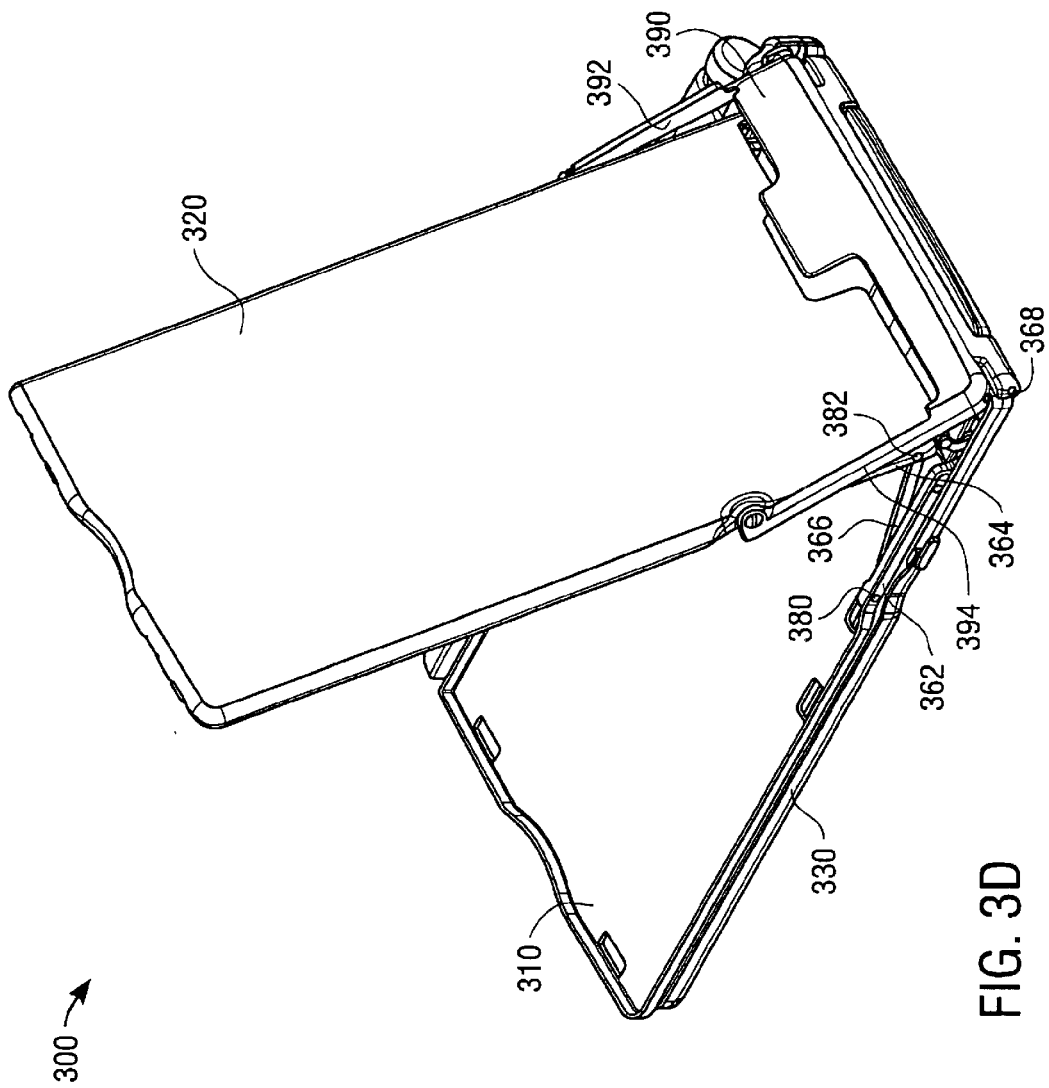
FIG. 3D illustrates one embodiment of a foldable keyboard in another partially unfolded configuration.

FIG. 3D illustrates keyboard assembly 300 in another intermediate folded configuration. Depending on one's perspective, keyboard assembly 300 maybe seen as either partially open or nearly folded. In this configuration, first keyboard section 310 extends marginally past support plate 330 because keyboard assembly 300 is closer to the folded configuration than the fully extended, unfolded configuration. As mentioned above, first keyboard section 310 is able to slide along support plate 330 because first keyboard 310 engages rails (not shown) on support plate 330. It should be noted that the movement of first keyboard section 310 may be accomplished by means other than engaging rails on support plate 330.

The movement of first keyboard section 310 along support plate 330 as illustrated from FIG. 3C to FIG. 3D shows that first keyboard section 310 has a width that is approximately the same width as support plate 330. Second keyboard section 320 also has approximately the same width as first keyboard section 310 and support plate 330. One end of second keyboard section 320 has an indented configuration corresponding to the uneven division between first keyboard section 310 and second keyboard section 320. The layout of keys in a standard QWERTY layout does not make for a division of the keyboard down the middle. Tab portion 396 of brace 390 integrates with indented portion 321 of second keyboard section 320. This way, when second keyboard section 320 lies flat over first keyboard section 310, the exposed surface of second keyboard section 320 appears smooth and seamless with brace 390.

Figure 3E:
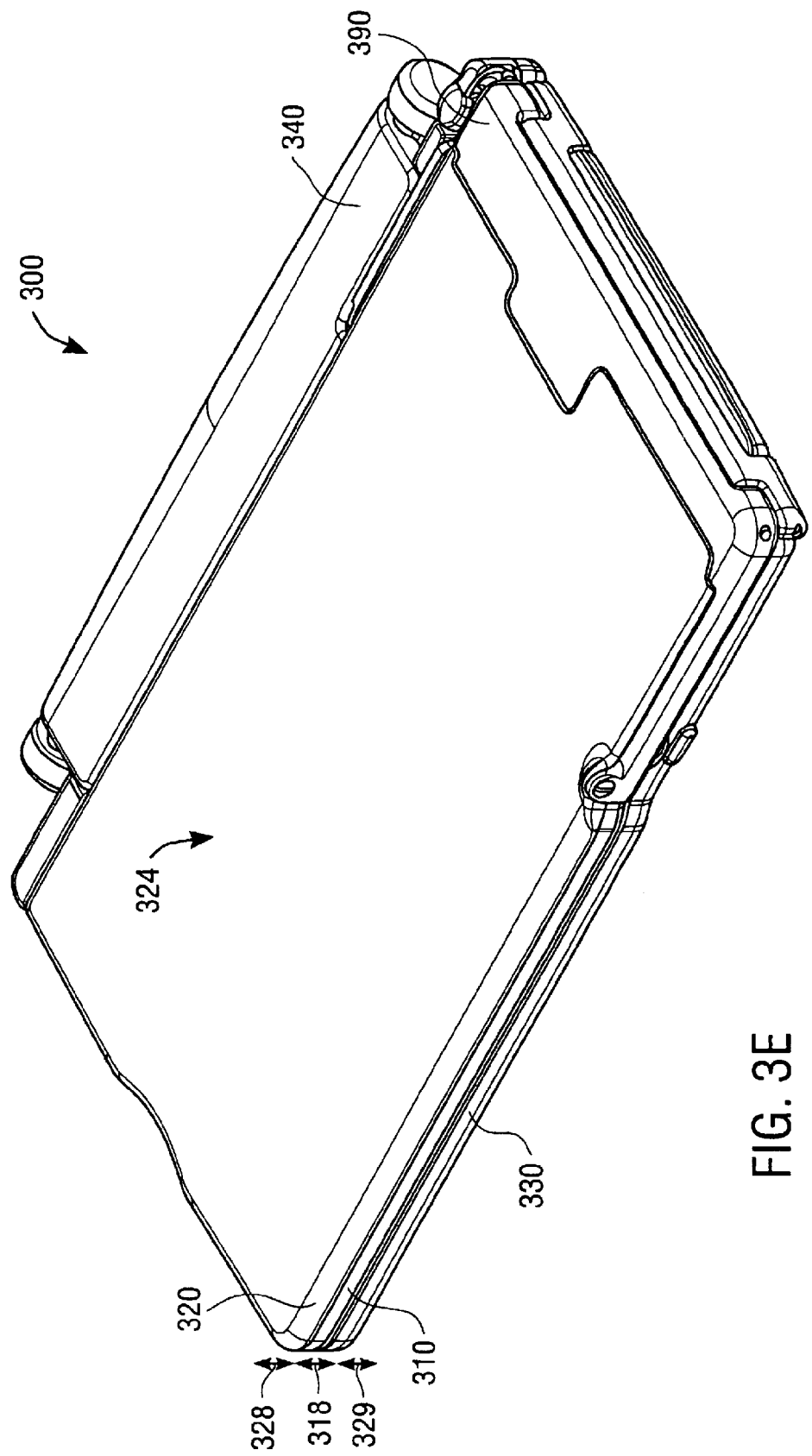
FIG. 3E illustrates one embodiment of a foldable keyboard in a folded configuration.

FIG. 3E illustrates keyboard assembly 300 in a completely folded configuration. In this perspective view, top side 324 of second keyboard section 320 is seen with first keyboard section 310 disposed between second keyboard section 320 and support plate 330. Brace 390 integrates with second keyboard section 320 such that top surface 324 appears to mate seamlessly with second keyboard section 320. This folded keyboard configuration may be one embodiment of a compact form keyboard assembly 300 may take.

In the completely folded configuration, keys (not shown) of first keyboard section 310 and second keyboard section 320 may face each other and be fully compressed, thereby minimizing the thickness of each keyboard section 310, 320. When the keys are fully depressed, the overall thickness of each keyboard section 310, 320 may be approximately the thickness 318, 328 of each keyboard section only. By having the keys compress as much as possible, the overall size of keyboard assembly 300 in the folded configuration may be minimized. In an alternative embodiment, the thickness of keyboard sections 310, 320 may be approximately half the thickness 329 of support plate 330. As such, in the folded configuration, the combined thickness of the keyboard sections 318, 328 is substantially the same as thickness 329 of support plate 330.

Figure 4A:
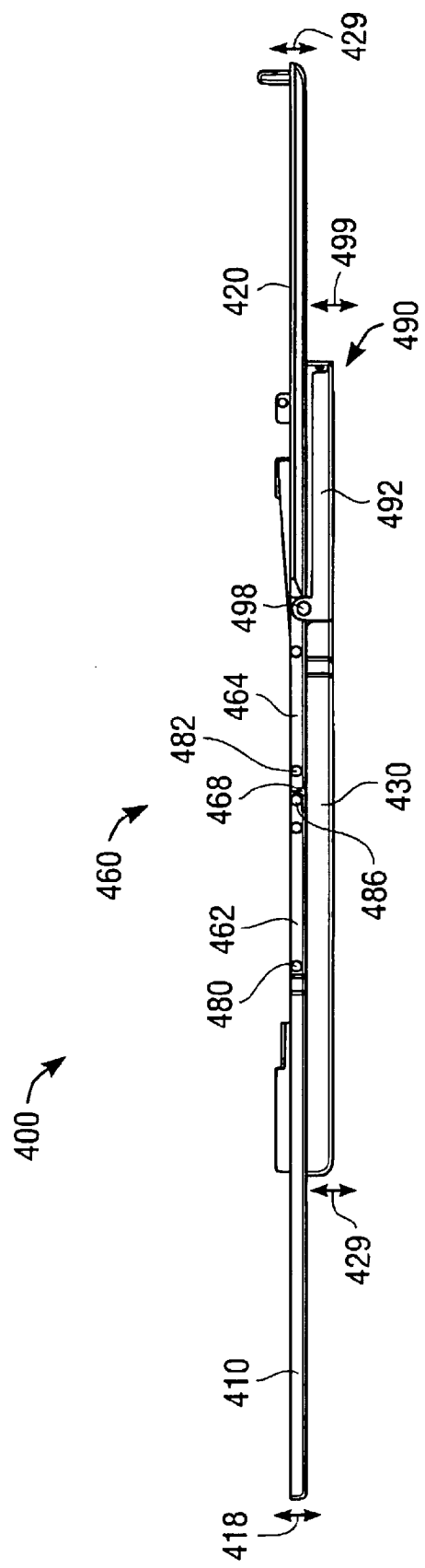
FIG. 4A illustrates in a side view one embodiment of a foldable keyboard in an unfolded configuration.
Figure 4B:
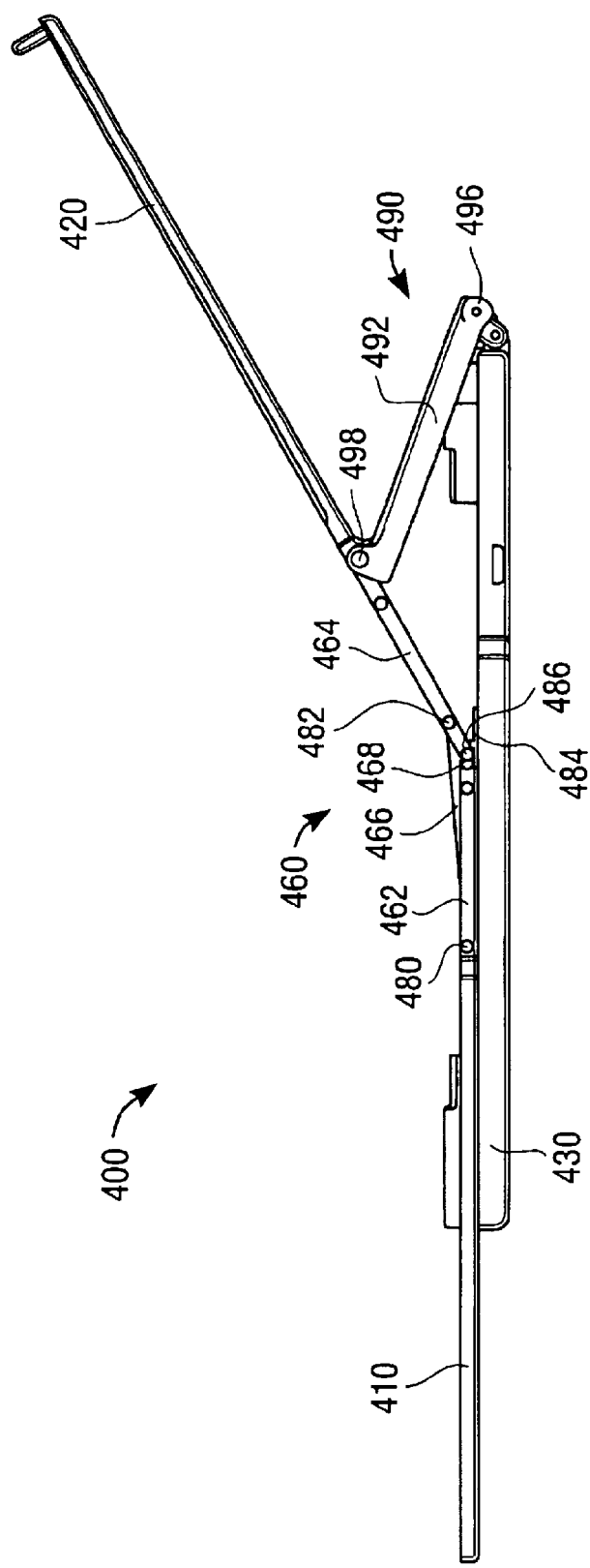
FIG. 4B illustrates in a side view one embodiment of a foldable keyboard in a partially unfolded configuration.
Figure 4C:
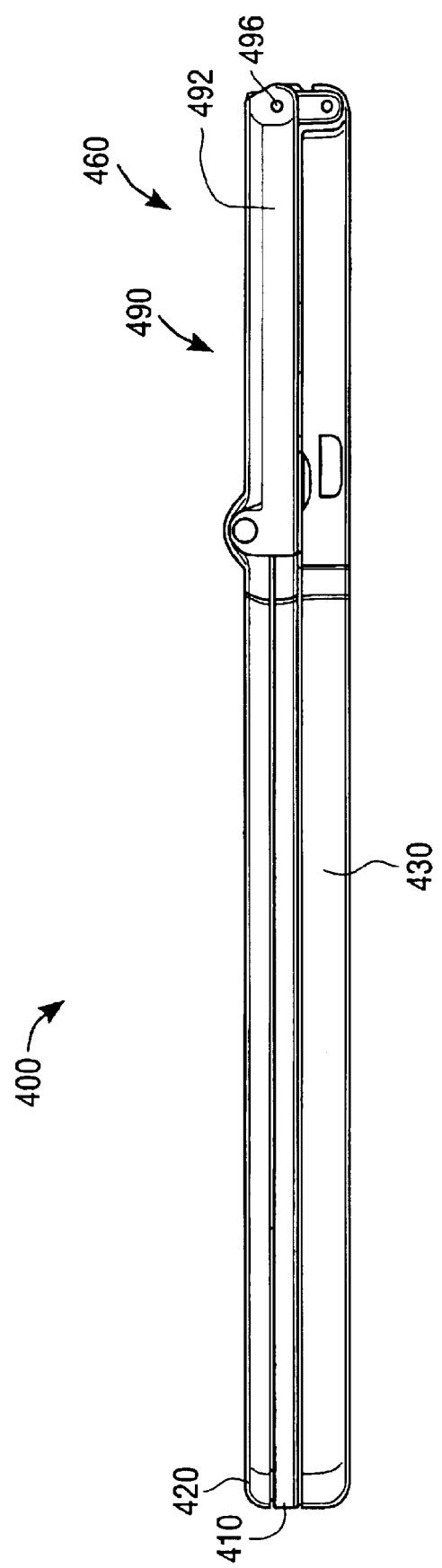
FIG. 4C illustrates in a side view one embodiment of a foldable keyboard in a folded configuration.

FIGS. 4A–4C illustrate a side view of keyboard assembly 400 changing from an unfolded configuration to a folded configuration. FIG. 4A shows keyboard assembly 400 in an unfolded configuration. First keyboard section 410 and second keyboard section 420 are generally co-planar with respect to each other and appear to integrate continuously with each other to form a full-size keyboard. In one embodiment, the full-size keyboard conforms to a QWERTY layout. Linkage 460 couples first keyboard section 410 and second keyboard section 420 to each other, as well as acting as the pivot region for second keyboard section 420 to fold with respect to the first keyboard section 410. Bar 468 of linkage assembly 460 shows the general location of the pivot region. In this unfolded configuration, pivots 480, 482, and 486 are visible. Pivot 484 is obstructed from view by support plate 430. First keyboard section 410 and second keyboard section 420 are generally similar in length and thickness.

Both keyboard sections 410, 420 are coupled to support plate 430. Support plate 430 is generally flat and rigid, and has a thickness 429 that is generally similar to the keyboard sections. In addition, support plate 430 has a length that is generally similar to each keyboard section 410, 420. As shown, support plate 430 couples to the keyboard sections 410, 420 simultaneously, and is disposed near a substantially center portion of the overall length of the first and second keyboard sections 410, 420. Because first keyboard section 410 and second keyboard section 420 are similar in length, it is not possible for support plate to extend across the entire length of both keyboard sections. As such, support plate 430 overlaps each keyboard section 410, 420 equally to provide a rigid and balanced support to keyboard assembly 400.

First arm 492 of brace 490 couples to support plate 430 along a horizontal edge of support plate 430. First arm 492 has thickness 499 substantially equal to the thickness 429 of support plate 430 so as not to add any additional thickness to support plate 430. First arm 492 of brace 490 extends from an end of support plate 430 to pivot 498.

FIG. 4B shows keyboard assembly 400 in an intermediate configuration in which keyboard assembly 400 is partially folded. As second keyboard section 420 is raised above support plate 430, brace 490 pivots at pivot ends 496, 498. First arm 492 pivots upwards from pivot end 496 of support plate 430 and at pivot end 498 where brace 490 is coupled to second keyboard section 420. Linkage assembly 460 with pivots 480, 482, 484, 486 that couple first keyboard section 410 and second keyboard section 420 has shifted horizontally along a length of support plate 430 towards pivot end 496. A portion of first keyboard section 410 still extends past support plate 430 at an end opposite pivot end 496.

The configuration of keyboard assembly 400 in FIG. 4B also shows the movement of four-bar linkage assembly 460. First bar 462 is coupled to an edge of first keyboard section 410 and second bar 464 is coupled to an edge of second keyboard section 420. Third bar 466 is coupled to first bar 462 at pivot 480 and to second bar 464 at pivot 482. Fourth bar 468 is also coupled to first bar 462 at pivot 484 (not visible) and to second bar 464 at pivot 486. The four pivots formed by linkage assembly 460 allow first keyboard section 410 to slide along support plate 430 while second keyboard section 420 folds over first keyboard section 410.

As second keyboard section 420 is raised above support plate 430, third bar 466 is raised such that pivot 482 is at a height above first keyboard section 410. Pivot 482 behaves as a moving pivot that arcs toward first bar 462. In the unfolded configuration as illustrated in FIG. 4A, pivot 482 is substantially co-planar with first bar 462 and pivot 480.

FIG. 4C illustrates keyboard assembly 400 in the folded configuration. Second keyboard assembly 420 rests on top of first keyboard assembly 410, keyboard sections 410, 420 together rest on support plate 430. In the folded configuration, the key cap surface (not shown) of keyboard sections 410, 420 oppose each other. Bottom surface 424 of second keyboard section 420 and bottom surface 434 of support plate 430 form the exterior surfaces of folded keyboard assembly 400. Bottom surfaces 424, 434 may be made of a hard, plastic or metallic material. As such, keyboard assembly 400 in the folded configuration forms a self-contained housing for keyboard sections 410, 420. The keys remain protected allowing keyboard assembly 400 to be truly portable without the potential of the keys becoming damaged.

The keyboard assembly in the folded configuration also maintains a very low profile. First keyboard section 410 and second keyboard section 420 have a combined thickness that is substantially equal to the thickness of support plate 430. In addition, keyboard sections 410, 420 and support plate 430 have substantially equal lengths, giving the folded keyboard the appearance of a rectangular unitary body.

Linkage assembly 460 region connecting first keyboard section 410 and second keyboard 420 has shifted near pivot end 496. In the folded configuration, linkage assembly 460 is not visible, having been disposed behind arm 492 of brace 490.

FIGS. 5A–5D illustrate perspective views of one embodiment of a linkage assemblies 560, 570 that enable keyboard assembly 501 to change from an unfolded configuration to a folded configuration. For clarity of description and understanding, linkage assemblies 560, 570 are illustrated without the corresponding keyboard sections. However, description of linkage assemblies 560, 570 may be considered with respect to the description above relating to the folding and unfolding of the keyboard sections, in particular, with respect to FIGS. 3A–3E and FIGS. 4A–4C.

Figure 5A:
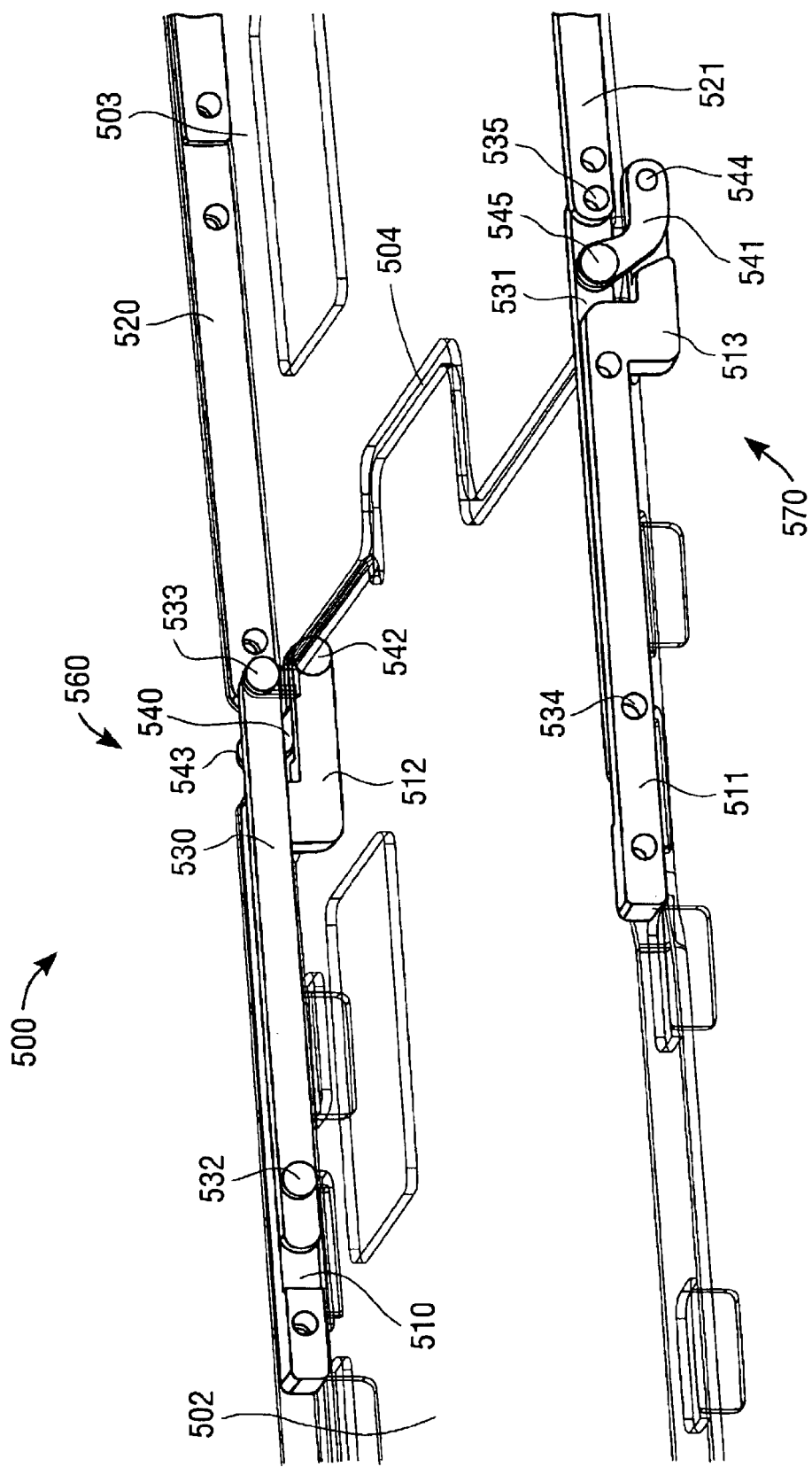
FIG. 5A illustrates one embodiment of a linkage assembly in an unfolded configuration.

The illustration in FIG. 5A shows the configuration of linkage assemblies 560, 570 corresponding to an unfolded keyboard configuration. Linkage assembly 560, coupled near one side of a keyboard assembly, is a four-bar linkage having first bar 510, second bar 520, third bar 530, and fourth bar 540. Alternatively, second four-bar linkage 570 may be disposed near the opposite side of linkage assembly 560. Second four-bar linkage 570 includes first bar 511, second bar 521, third bar 531, and fourth bar 541.

First bar 510 is coupled to first keyboard section 502 along a horizontal edge of first keyboard section 502. First bar 510 has arm portion 512 that extends towards second keyboard section 503 at a height below the longer elongated portion of first bar 510. As will be described in greater detail below, first bar 510 is configured with arm portion 512 to enable fourth bar 540 to pivot such that in the folded configuration, second keyboard section 503 may rest evenly on first keyboard section 502.

Second bar 520 is coupled to the second keyboard section 503 along a horizontal edge of second keyboard section 503. In the unfolded keyboard configuration, first bar 510 and second bar 520 are substantially co-planar. First bar 510 and second bar 520 have a length that may be shorter than the length of each keyboard section 502, 503, and as such, do not extend along the entire length of both keyboard sections 502, 503. First bar 510 and second bar 520 are disposed near division 504 between first keyboard section 502 and second keyboard section 503.

First bar 510 and second bar 520 may not be directly coupled together; alternatively, they may be coupled together through third bar 530. Third bar 530 is coupled to first bar 530 at pivot 532 and to second bar 520 at pivot 533. First bar 510 and second bar 520 is also coupled through fourth bar 540. Fourth bar 540 is coupled to arm portion 512 of first bar 510 at pivot 542, and to second bar at pivot 543. Fourth bar 540 is a short segment that is slightly bent from pivot 542 to pivot 543.

As noted above, keyboard assembly 501 may also have a second linkage assembly 570. Although not necessary to enable keyboard assembly 501 from folding and unfolding, second linkage assembly 570 provides added support and stability. Second linkage assembly 570 has corresponding four-bar linkage 511, 521, 531, 541 with corresponding pivots 534, 535, 544, 545 as described for linkage 560.

Figure 5B:
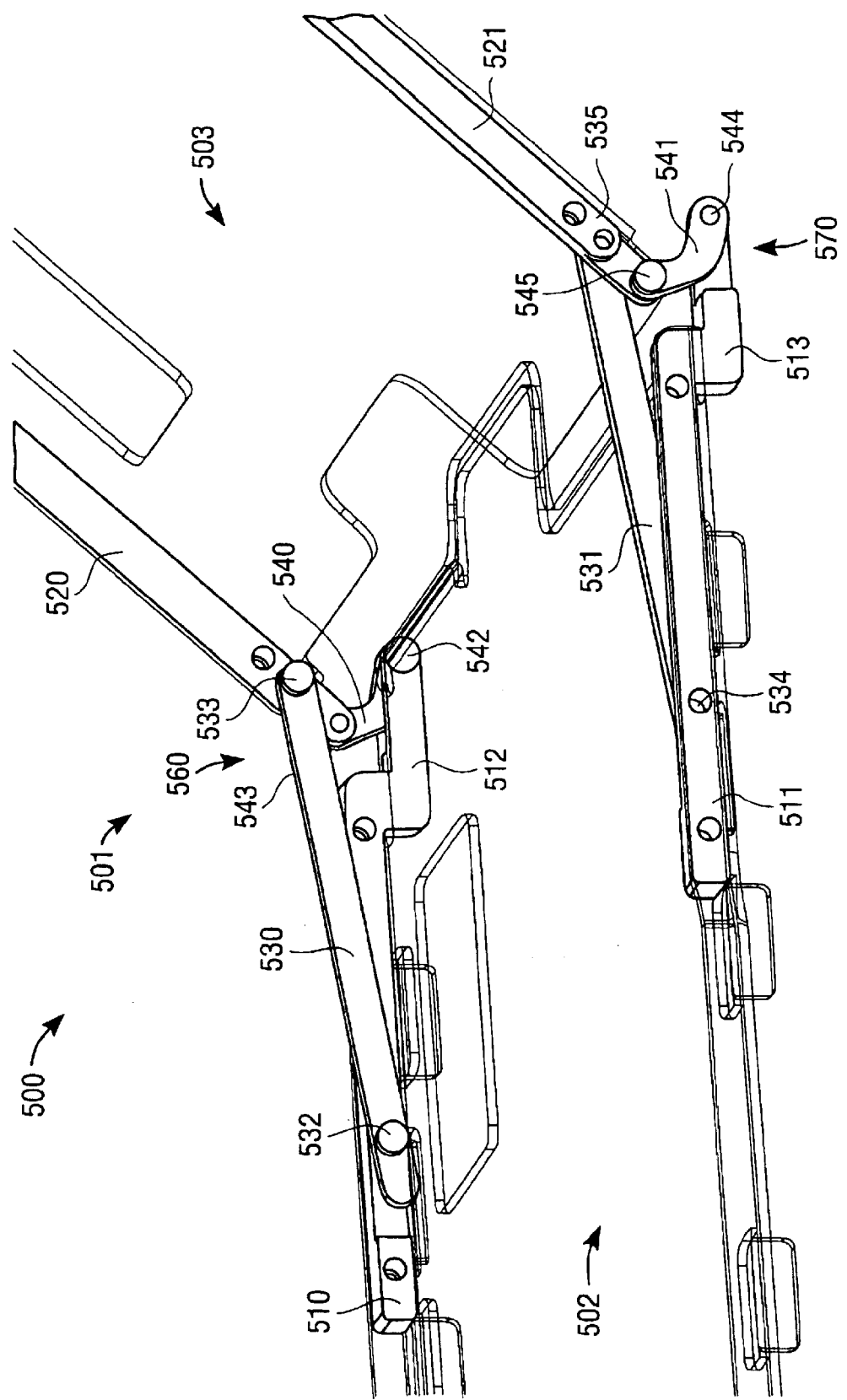
FIG. 5B illustrates one embodiment of a linkage assembly in a partially unfolded configuration.

Linkage assemblies 560, 570 illustrated in FIG. 5B correspond to keyboard assembly 501 in a partially folded configuration. The change in configurations of the four-bar linkage assemblies 560, 570 and corresponding pivots 532, 533, 542, 543, 534, 535, 545, 544 may be compared to linkage assemblies 560, 570 in the unfolded configuration of FIG. 5A, to show the mechanics of linkage assemblies 560, 570. As second keyboard section 503 is raised and rotated towards first keyboard section 502, pivot 533 rotates with respect to pivot 532 from its relatively co-planar configuration with second bar 520 and first bar 510. Pivot 543 rotates with respect to pivot 542. Thus, pivots 533 and 543 act as moving pivots while pivots 532 and 542 remain stationary. The linkage assemblies 560, 570 operate such that when keyboard assembly 501 changes from an unfolded configuration to a folded configuration, moving pivots 533 and 543 rotate in opposite directions. Pivot 533 moves towards first bar 510 while pivot 543 moves away from first bar 510.

Figure 5C:
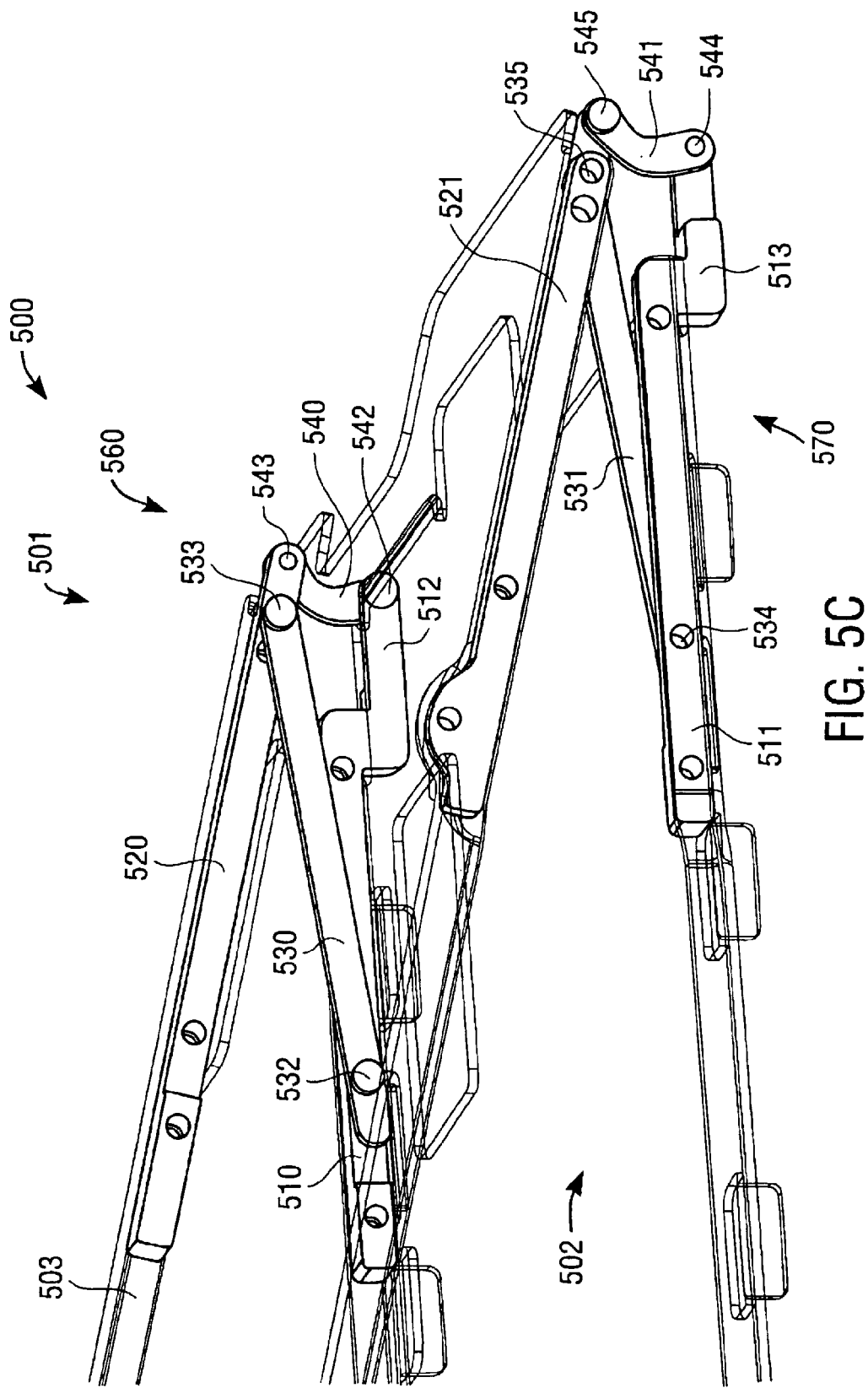
FIG. 5C illustrates one embodiment of a linkage assembly in another partially unfolded configuration.

FIG. 5C shows linkage assemblies 560, 570 in a position with first keyboard section 502 and second keyboard section 503 in a nearly closed configuration. Second bar 520 has rotated nearly 180 degrees towards first bar 510.

Figure 5D:
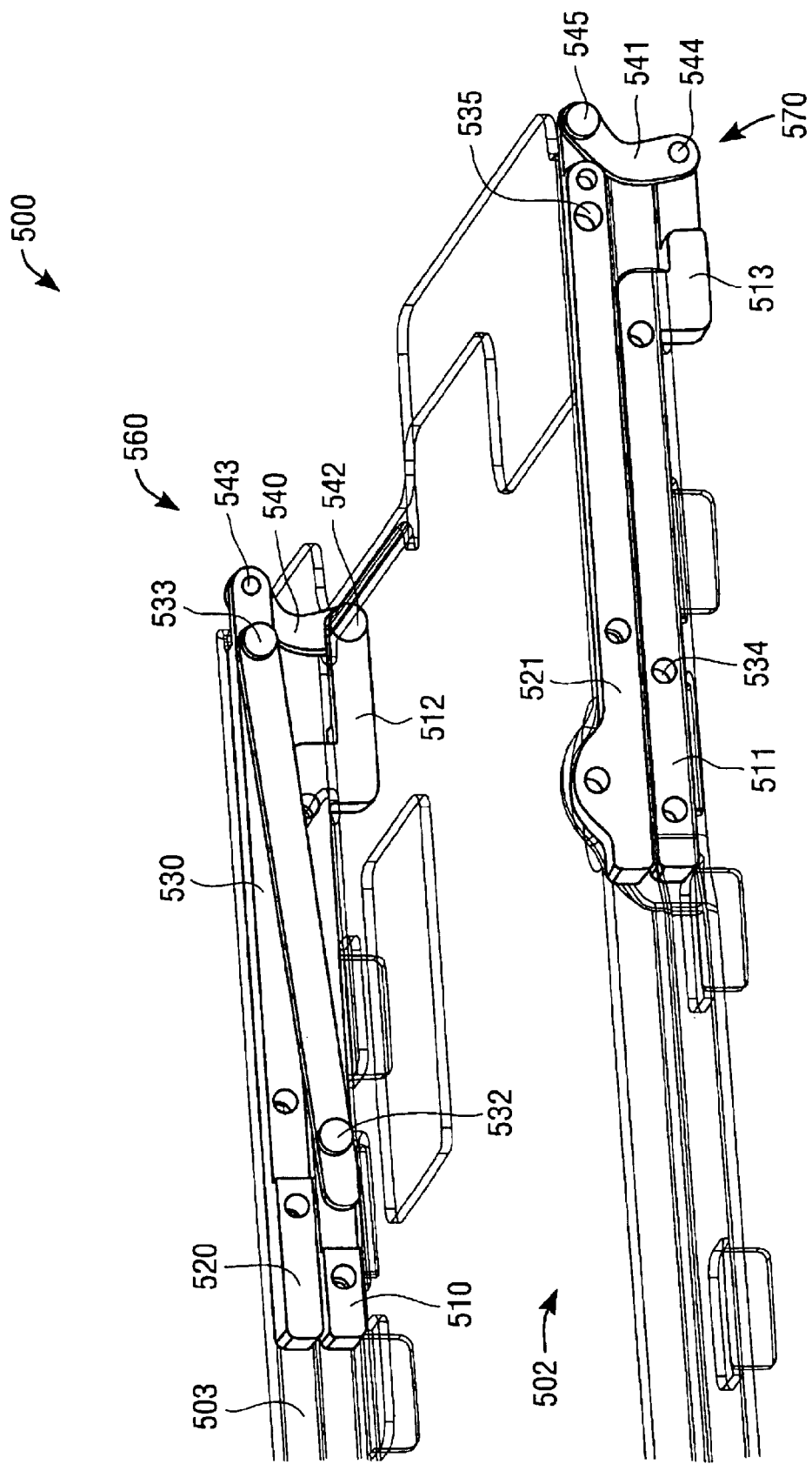
FIG. 5D illustrates one embodiment of a linkage assembly in a folded configuration.

FIG. 5D shows linkage assemblies 560, 570 in a configuration that corresponds to a completely folded keyboard assembly with second keyboard section 503 rotated over first keyboard section 502. Second bar 520 rests on first bar substantially parallel to each other. Second bar 520, pivot 533, and pivot 543 are generally along the same plane. Third bar 530 spans diagonally across both first bar 510 and second bar 520 from pivot 532 to pivot 533.

Linkage assemblies 560, 570 illustrated in FIG. 5D correspond to a folded keyboard configuration. Linkage assembly 560 has four bars 510, 520, 530, 540. In one embodiment, second linkage assembly 570 may be disposed on an opposite side of linkage assembly 560. Second linkage assembly 570 has four bars 512, 522, 532, 540 and pivots 534, 535, 544, 545.

Figure 2I:
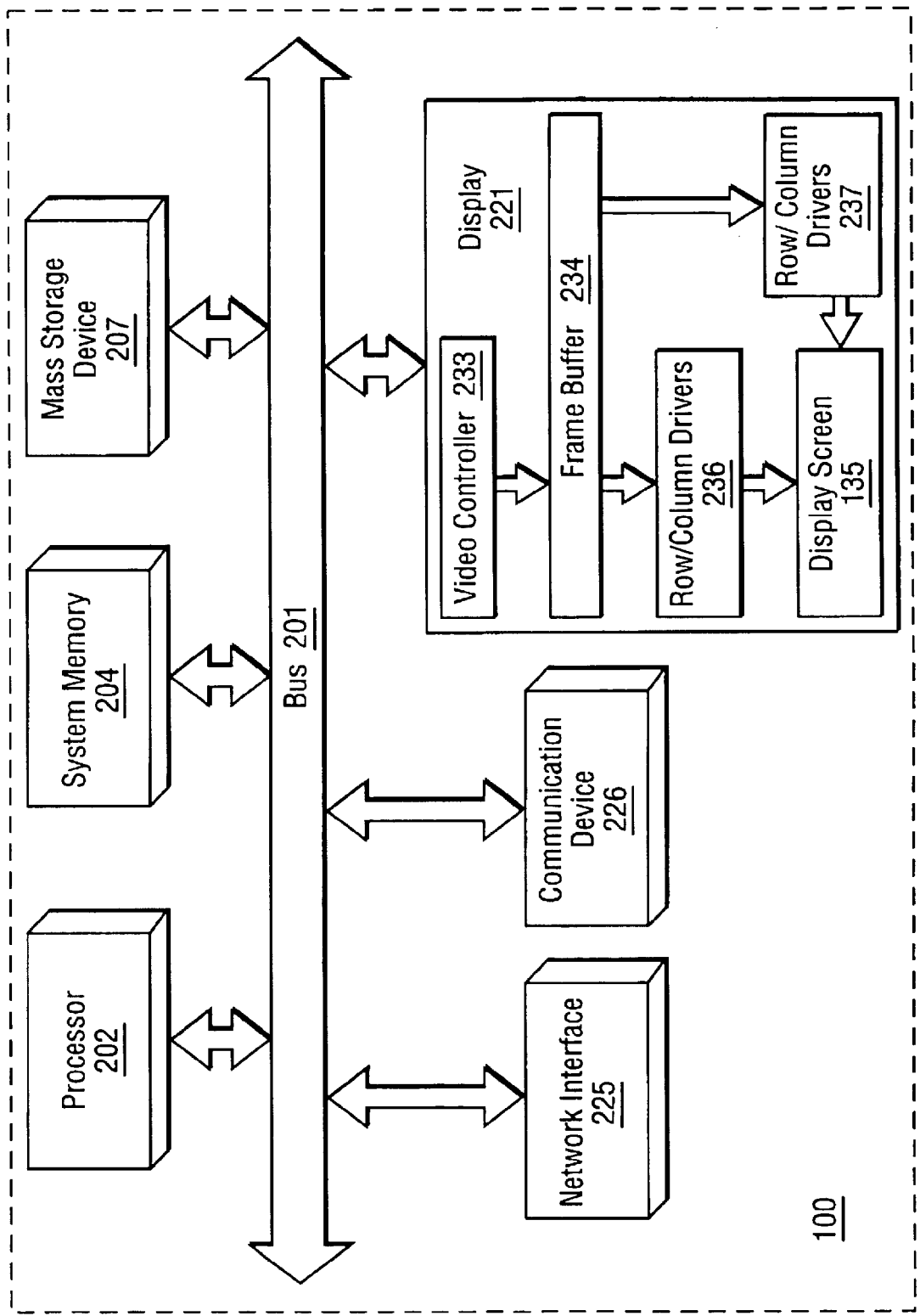
FIG. 2I illustrates one embodiment of the components of digital processing device.

Digital processing device 100 also includes hardware and software components to enable it to operate as a digital processing device. FIG. 2I illustrates one embodiment of the hardware components of digital processing device 100. In one embodiment, digital processing device 100 includes a bus or other communication means 201 for communicating information, and a processing means such as processor 202 coupled with bus 201 for processing information. Bus 201 may include address, data, and/or control lines to provide communication among the various components of device 100. Processor 202 may represent one or more processors such as an Intel Strongarm, an Intel Xscale, or an Intel Pentium processor, etc. In one embodiment, digital processing device 100 is configured to operate with a POCKET PC operating system stored on data storage device 207. In alternative embodiments, another operating system may be used, for examples, PALM, LINUX, Windows CE, or Windows.

Digital processing device 100 further includes device memory 204 that may include a random access memory (RAM), or other dynamic storage device, coupled to bus 201 for storing information and instructions to be executed by processor 202. Device memory 204 also may be used for storing temporary variables or other intermediate information during execution of instructions by processor 202. Device memory 204 may also include a read only memory (ROM) and/or other static storage device coupled to bus 201 for storing static information and instructions for processor 202.

A data storage device 207 such as a magnetic disk drive (e.g., a micro-drive) may also be coupled to digital processing device 100 for storing information and instructions. The data storage device 207 may be used to store data and software for performing various digital processing functions.

The various components illustrated in FIG. 2I may be disposed within either of base plate 110 or display assembly 130. In one embodiment, components disposed within base plate 110 may be coupled to other components in display assembly 130 (e.g., bus 201) using a flex circuit that runs through embodiments of the hinge assembly. In addition, the keyboard assembly 120 may be coupled to bus 201 using a flex circuit running through hinge assembly.

It will be appreciated that the components shown in FIG. 2I represents only one example of digital processing device 100, which may have many different configurations and architectures, and which may be employed with the present invention. For example, device 100 may include multiple buses, such as a peripheral bus, a dedicated cache bus, a local bus, etc. to connect certain components. Moreover, digital processing device 100 may include additional components. For example, in one embodiment, digital processing device 100 may include one or more of hardware and software components found in commercially available notebook computers or PDA's such as the COMPAQ IPAQ, the Hewlett Packard Jornada or Palm Connected Organizers, for example, an MP3 player, a digital recorder, image viewer, auxiliary device interfaces (e.g., PCMCIA, Compact Flash, SIMD), auxiliary device cards (e.g., PCMCIA card, Compact Flash card, SIMD card), wireless modem, battery pack, etc. Such components may be detachably coupled with the digital processing device 100 or, alternatively, integrated into the device in either the base 110 or the display assembly 130.

In one embodiment, for example, the digital processing device 100 may include a wireless communication device (e.g., a modem) integrated into the base 110. An antenna may be adjustably coupled to the base 110 to allow for repositioning of the antenna so as not to interfere with typing on the keyboard assembly 120 or operation of the various hinge assemblies during reconfiguration of the device 100.

As previously discussed, device 100 is designed to enable rotation of the image rendered on display screen 135.

Display 221 receives signals from processor 202 to enable the generation of a frame image on display screen 135. In one embodiment, processor 202 transmits information to video controller 233 to display images in a particular orientation on display screen 135. A change in orientation may be initiated, for example, based on a hardware switch connected to display assembly 130. Display screen 135 may be, for example, a liquid crystal display (LCD) screen. Display screen 135 may include an array of picture elements ("pixels") cells (not shown) that form corresponding pixels of the frame image. A pixel is the basic unit of programming in an image or frame. A pixel is the smallest area of a display's screen that can be turned on or off to help create the image with the physical size of a pixel depending on the resolution of the display. Pixel cells may be formed into rows and columns of a display in order to render a frame image.

In one embodiment, display screen 135 may be a color display screen capable of rendering color images. If the frame buffer 234 contains a color image, each pixel may be turned on with a particular color in order to render the color image. The specific color that a pixel describes is some blend of components of the color spectrum such as red, green, and blue. To accomplish this, each pixel cell may receive an electrical voltage that controls the optical properties of the pixel cell and, thereby, the intensity of the corresponding pixel cell. The electrical voltages for particular pixel cells are transmitted by corresponding row/column drivers 236 and 237.

Digital processing device 100 may also have additional related components, for example, analog-to-digital converters, timing generators, voltage sources, logic circuits, etc. (not shown) in order to generate an image on display screen 135. Image rendering and related components are known in the art; accordingly, a detailed discussion is not provided. In one embodiment, video controller 233 is a MediaQ video controller. Alternatively, the operation of video controller 233 may be performed by processor 202 to control the generation of images on display screen 135. In another embodiment, display screen 135 may be a monochrome display screen.

As previously mentioned, the image rendered on display screen 135 may be rotated from a portrait mode to a landscape mode when the digital processing device is reconfigured from a PDA configuration (e.g., as illustrated in FIG. 2B) to a keyboard typing configuration (e.g., as illustrated in FIG. 2E), respectively. The portrait mode has text and/or graphics that are oriented perpendicular to the longest side of the display assembly. In one embodiment, when processor 202 detects a toggle of the hardware switch, the processor 202 executes an instruction to video controller 233 to initiate screen image rotation. Video controller 233 loads data (e.g., received from processor 202 or stored in memory 204) representative of the desired image orientation in frame buffer 234 to control row/column drivers 236 and 237 to render a set of RGB values for each pixel cell in display screen 135.

In one embodiment, screen image rotation may be performed using screen buffer transforms which are known in the art that are not dependent on the LCD's physical or electrical design. The screen rotation is achieved during the frame buffer 234 reading instead of inside the physical display itself. By logically changing frame buffer 234 reading scan start point and the address counter increase or decrease directions, it should be noted that any degree of image rotation on display screen 135 (e.g., 90 degrees, 180 degrees, 270 degrees) may be performed. For a specific screen rotation, the parameters that control the frame buffer memory address can be written into the graphics chip in advance, or be changed dynamically.

As another example, for more complicated color depths (e.g., those that lie on non-byte boundaries), the pixels may be moved by copying the number of bits that make a pixel from the horizontal (e.g., row) to a pixel-aligned position in the vertical (e.g., column). For 12-bit color, for example, the copying may be performed 12-bits at a time.

In the forgoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A digital processing device, comprising:
    a rigid base;
    a display assembly comprising a display screen;
    a foldable keyboard assembly coupled with the base, said foldable keyboard assembly having keyboard sections substantially equal in size; and
    a hinge assembly rotatably coupling the display assembly to the base, the hinge assembly enabling the display assembly to be rotated between a first configuration and a second configuration.

2. The digital processing device of claim 1, wherein the base has a front and a back and the display assembly has a side, a back and a front, and wherein the first configuration configures the display assembly to be in contact with the back of the base and wherein the second configuration configures the display assembly to form an angle of at least 180 degrees between the front of the display assembly and the keyboard assembly.

3. The digital processing device of claim 1, wherein the hinge assembly is configured to rotate through substantially 360 degrees.

4. The digital processing device of claim 1, wherein the hinge assembly comprises:
    first and second hinge linkages cross-connected between the base and the display assembly relative to each other.

5. The digital processing device of claim 4, wherein the cross-connected linkages enables rotation of the base and display assembly without any substantial translation with respect to each other.

6. The digital processing device of claim 4, wherein at least one of the first and second hinge linkages contains a flex circuit disposed within a cavity.

7. The digital processing device of claim 1, wherein the hinge assembly rotatably couples the display assembly to the base at four pivot axes.

8. The digital processing device of claim 1, wherein the hinge assembly comprises:
    a first hinge coupled to the base at a first base pivot axis and coupled to the display assembly a first display assembly pivot axis; and
    a second hinge coupled to the base a second base pivot axis different than the first base pivot axis, the second hinge coupled to the display assembly at a second display assembly pivot axis different from the first display assembly pivot axis.

9. The digital processing device of claim 8, wherein a first distance between the first display assembly pivot axis and the second display assembly pivot axis is the same as a distance between a second distance between the first base pivot axis and the second base pivot axis.

10. The digital processing device of claim 9, the first and second hinges form a common axis of rotation between the base and the display assembly.

11. The digital processing device of claim 1, the hinge assembly forms a common axis of rotation between the base and the display assembly.

12. The digital processing device of claim 1, wherein the hinge assembly rotatably couples the keyboard assembly along a longest side of the display assembly.

13. The digital processing device of claim 1, wherein the first configuration enables information entry into the digital processing device through the display screen and wherein the second configuration enables information entry into the digital processing device using the keyboard assembly.

14. The digital processing device of claim 13, wherein the display screen is configured to display an image in first and second orientations corresponding to the first and second configurations, respectively.

15. The digital processing device of claim 14, wherein the first and second orientations are disposed 90 degrees relative to each other.

16. The digital processing device of claim 14, wherein the image on the display screen automatically orientates from the first and second orientations corresponding to the first and second configurations, respectively.

17. The digital processing device of claim 16, wherein the image on the display screen automatically orientates using a screen buffer transforms.

18. The digital processing device of claim 1, wherein the keyboard assembly unfolds to a plurality of keys having a kev displacement of about 2 mm to about 4 mm.

19. The digital processing device of claim 1, wherein the keyboard assembly comprises keys and wherein the keys are not exposed when in first configuration.

20. The digital processing device of claim 1, wherein at least one set of keys of the keyboard assembly slides from a second position in the second configuration to a first position for storage in the first configuration.

21. The digital processing device of claim 1, wherein the keyboard assembly comprises first and second key panels and wherein each of the first and second key panels has a length that is no greater than approximately the length of the base.

22. The digital processing device of claim 21, wherein the keyboard assembly comprises a linkage mechanism to substantially center adjoining edges of the first and second panels over the base when the keyboard assembly is completely unfolded.

23. The digital processing device of claim 21, wherein a linkage mechanism operates to slide the first panel in response to rotation of the second panel.

24. The digital processing device of claim 21, wherein a linkage mechanism comprises a moving pivot point of the second panel.

25. The digital processing device of claim 21, further comprising a third panel disposed over a section of the first panel exposed by the second panel when folded over the first panel.

26. The digital processing device of claim 1, wherein the keyboard assembly comprises keys having centers and wherein at least two keys have a distance between the centers of at least approximately 18 mm.

27. The digital processing device of claim 1, wherein the keyboard assembly comprises:
a first keyboard section and a second keyboard section; and at least one linkage assembly coupled to the first keyboard section and the second keyboard section, the at least one linkage assembly to enable the keyboard sections to alternate between a folded configuration and an unfolded configuration, the at least one linkage assembly comprising:
a first bar coupled to the first keyboard section along a length of the first keyboard section near a region where the first keyboard section meets the second keyboard section in the unfolded configuration;
a second bar coupled to the second keyboard section along a length of the second keyboard section near a region where the second keyboard section meets the first keyboard section in the unfolded configuration;
a third bar coupled to the first bar and the second bar; the third bar having a first pivot coupled to the first bar and a second pivot coupled to the second bar, the second pivot to move along a rotating arc of the first pivot; and
a fourth bar coupled to the first bar and the second bar, the fourth bar having a third pivot coupled to the first bar and a fourth pivot coupled to the second bar.

28. The digital processing device of claim 1, wherein the foldable keyboard assembly comprises two keyboard sections.

29. A digital processing device, comprising:
a keyboard assembly having a collapsed form relative to an open form, the open form exposing a plurality of keys having a center-to-center spacing of about 19 mm; and
a display assembly coupled with the keyboard, the display assembly configured to display data in a landscape mode when the keyboard assembly is in the open form and to display data in a portrait mode when the keyboard assembly is in the collapsed form.

30. The digital processing device of claim 29, wherein the keyboard assembly comprises:
a first keyboard section having first keys of said plurality of keys; and
a second keyboard section having second keys of said plurality of keys, wherein the first keys face the second keys and are compressed when the keyboard assembly is in the collapsed form.

31. The digital processing device of claim 30, wherein the keyboard assembly is foldable and said digital processing device is a mobile computer.

32. The digital processing device of claim 31, wherein the display assembly is rotatably coupled to the keyboard assembly.

33. The digital processing device of claim 29, wherein said plurality of keys have a key displacement between about 2 mm to about 4 mm and a force near the character generation point between about 0.25 N to about 1.5 N.

34. The digital processing device of claim 29, wherein said keyboard assembly further comprises at least one key which does not substantially comply with said key sizes.

35. The digital processing device of claim 29, further comprising:
a cellular communication transceiver for voice communications and for network data communications, said cellular communication transceiver coupled to a keyboard controller which is coupled to said keyboard assembly.

36. A digital processing device, comprising:
a rigid base;
a display assembly comprising a display screen;

a foldable keyboard assembly coupled with the base, said foldable keyboard assembly having keyboard sections substantially equal in size; and means for rotatably coupling the display assembly to the base enabling the display assembly to be rotated between a first configuration and a second configuration.

37. The digital processing device of claim 36, further comprising means for rotating the base and display assembly without any substantial translation with respect to each other.

38. The digital processing device of claim 36, further comprising means for entering information into the digital processing device through the display assembly in the first configuration and means for entering information using the foldable keyboard assembly in the second configuration.

39. The digital processing device of claim 36, further comprising means for automatically orientating an image on the display assembly from a first and a second orientation corresponding to the first and second configurations, respectively.

40. The digital processing device of claim 36, wherein the foldable keyboard assembly comprises two keyboard sections.

41. A digital processing device, comprising:

means for collapsing a keyboard assembly having a collapsed form relative to an open form, the open form exposing a plurality of keys having a center-to-center spacing of about 19 mm; and means for coupling a display assembly with the keyboard, the display assembly configured to display data in a landscape mode when the keyboard assembly is in the open form and to display data in a portrait mode when the keyboard assembly is in the collapsed form.

42. The digital processing device of claim 41, further comprising means for folding the keyboard from the collapsed form to the open form.

43. The digital processing device of claim 41, further comprising means for entering information into the digital processing device through the display screen in a first configuration and means for entering information using the keyboard assembly in a second configuration.

44. The digital processing device of claim 41, further comprising means for automatically orientating data on the display assembly from the portrait mode and the landscape mode.

* * * * *